United States Patent
Long et al.

(10) Patent No.: US 12,332,758 B2
(45) Date of Patent: Jun. 17, 2025

(54) METHOD FOR DETECTING VIDEO SURVEILLANCE DEVICE, AND ELECTRONIC DEVICE

(71) Applicant: HUAWEI TECHNOLOGIES CO., LTD., Shenzhen (CN)

(72) Inventors: Shuiping Long, Beijing (CN); Xiaona Zhao, Shenzhen (CN); Qingchao Huang, Beijing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 101 days.

(21) Appl. No.: 18/250,185

(22) PCT Filed: Sep. 9, 2021

(86) PCT No.: PCT/CN2021/117425
§ 371 (c)(1),
(2) Date: Apr. 21, 2023

(87) PCT Pub. No.: WO2022/083343
PCT Pub. Date: Apr. 28, 2022

(65) Prior Publication Data
US 2023/0396580 A1    Dec. 7, 2023

(30) Foreign Application Priority Data
Oct. 22, 2020  (CN) .......................... 202011137743.5

(51) Int. Cl.
*G06F 11/30* (2006.01)
*G06F 21/55* (2013.01)
(Continued)

(52) U.S. Cl.
CPC .......... *G06F 11/3051* (2013.01); *G06F 21/55* (2013.01); *H04L 41/12* (2013.01); *H04L 43/065* (2013.01); *H04L 43/12* (2013.01)

(58) Field of Classification Search
CPC ................. H04L 61/2596; H04L 61/35; H04L 2101/622; H04L 43/065; H04L 43/12; H04W 4/38; G06F 11/3051; G06F 21/55
See application file for complete search history.

(56) References Cited

U.S. PATENT DOCUMENTS

2019/0296979 A1* 9/2019 Gupta .................... G06N 20/00

FOREIGN PATENT DOCUMENTS

| CN | 108521398 A | 9/2018 | |
| CN | 108718257 A | * 10/2018 | ........... H04L 43/026 |

(Continued)

OTHER PUBLICATIONS

Cowan, "Detecting Hidden Wireless Cameras through Network Traffic Analysis", vtechworks.lib.vt.edu (Year: 2020).*

(Continued)

*Primary Examiner* — Boris D Grijalva Lobos
(74) *Attorney, Agent, or Firm* — Leydig, Voit & Mayer, Ltd.

(57) ABSTRACT

A method for detecting a video surveillance device includes: obtaining MAC address information and port information of at least one target device that accesses a same wireless network as the electronic device; determining, based on the MAC address information, whether the target device is a video surveillance device; if determining cannot be performed based on the MAC address information, determining, based on the port information or based on the MAC address information and the port information, whether the target device is a video surveillance device; and if determining still cannot be performed, obtaining fingerprint information of the target device by using a TCP port-based or UDP port-based probe protocol, and further determining, based on the fingerprint information, whether the target device is a video surveillance device.

20 Claims, 15 Drawing Sheets

(51) Int. Cl.
      *H04L 41/12*       (2022.01)
      *H04L 43/065*     (2022.01)
      *H04L 43/12*       (2022.01)

(56) References Cited

FOREIGN PATENT DOCUMENTS

| CN | 111132120 A | | 5/2020 |
| --- | --- | --- | --- |
| CN | 111314693 A | * | 6/2020 |

OTHER PUBLICATIONS

Sivanathan et al., "Can We Classify an IoT Device using TCP Port Scan?" 2018 IEEE International Conference on Information and Automation on Information and Automation for Sustainability (ICIAFS), IEEE, XP033664923, Total 4 pages (Dec. 21, 2018).

Apablaza et al., "RTSP Real Time Streaming Protocol," doi:978-613-6-12706-4, Total 10 pages (Dec. 3, 2010).

Sivanathan et al., "Can We Classify an IoT Device using TCP Port Scan?," 2018 IEEE International Conference on Information and Automation for Sustainability (ICIAfS), Total 4 pages (Dec. 2018).

* cited by examiner

METHOD FOR DETECTING VIDEO SURVEILLANCE DEVICE, AND ELECTRONIC DEVICE

This application is a National Stage of International Application No. PCT/CN2021/117425, filed on Sep. 9, 2021, which claims priority to Chinese Patent Application No. 202011137743.5, filed on Oct. 22, 2020. Both of the aforementioned applications are incorporated herein by reference in their entireties.

TECHNICAL FIELD

This application relates to the field of video surveillance device detection technologies, and in particular, to a method for detecting a video surveillance device, and an electronic device.

BACKGROUND

In recent years, there are a variety of and a large quantity of widely used micro-cameras on the market. Secret photography cases frequently occur in private places such as hotels and are increasing. Relevant departments such as national judicial and law enforcement departments are also paying increasing attention. Currently, most of these cameras are internet protocol cameras (IPCs) and support networking and storage functions. More than 90% of these cameras are connected to a wireless fidelity (Wi-Fi) network. A surveillance image may be uploaded to a cloud in real time for storage, and may also be viewed on a user side in real time by using a surveillance application (APP), leading to a user privacy invasion incident.

Currently, some special detection devices are available on the market. These detection devices detect IPC devices mainly by using optical, thermal, and electromagnetic wave principles. For example, a flash is used to emit light to a surrounding area, and whether there is a reflective spot is observed; a thermal imager is used to scan a surrounding area, and whether there is a local hotspot is observed; or a video scanner is used to scan a band of 50 MHz to 3 GHz, and whether there is a device on the band is observed. However, these special detection devices are expensive, and hardware used in the devices can hardly be integrated into a mobile phone. In addition, a user usually needs to actively perform searching and probing everywhere in a space to be searched, leading to poor user experience. In addition, in common scenarios, there is much environmental interference to light reflection, heat emission, and electromagnetic fluctuations, and both a false detection rate and a missing detection rate of a device are high.

To resolve the foregoing problems, some internet manufacturers launch camera detection functions in APPs of the internet manufacturers, usually for scanning and probing, in a local area network accessed by a mobile phone, another device in the network to obtain device information. However, probe techniques used in the detection functions are simple, and data in a maintained fingerprint database is incomplete or is not updated in time. As a result, there are many missing detection cases. In addition, actual tests show that these detection functions are quite unstable. A quantity of IPC devices detected each time varies and fluctuates greatly, and a missing detection rate is high.

SUMMARY

This application provides a method for detecting a video surveillance device, and an electronic device, to improve detection accuracy and reduce a missing detection rate. Scenarios to which technical solutions of this application are applicable may be places such as a hotel lobby and a room. The electronic device in this application can effectively detect secret photography IPCs that are maliciously mounted in such places, thereby reducing user privacy invasion incidents.

According to a first aspect, a method for detecting a video surveillance device is provided. The method is applied to an electronic device, and includes: obtaining media access control (MAC) address information of at least one target device, where the electronic device and the target device access a same wireless network; obtaining port information of the target device; determining, based on the MAC address information, whether the target device is a video surveillance device; if whether the target device is a video surveillance device cannot be determined based on the MAC address information, determining, based on first information, whether the target device is a video surveillance device, where the first information includes the MAC address information and the port information, or the first information includes the port information; if whether the target device is a video surveillance device cannot be determined based on the first information, obtaining fingerprint information of the target device by using a TCP port-based probe protocol or a UDP port-based probe protocol; and determining, based on the fingerprint information, whether the target device is a video surveillance device.

In an embodiment provided in this application, the MAC address information or the port information of the target device that accesses the same wireless network is obtained, and the fingerprint information of the target device is obtained by using the TCP port-based or UDP port-based probe protocol in different cases, to determine whether the target device is a video surveillance device. In the technical solution of this application, for various video surveillance devices on the market, a plurality of detection techniques including the MAC address information, the port information, and the TCP port-based or UDP port-based probe protocol are used to provide a more comprehensive detection solution, thereby effectively improving detection accuracy and reducing a missing detection rate. Scenarios to which the technical solution of this application is applicable may be places such as a hotel lobby and a room. The electronic device in this application can effectively detect secret photography IPCs that are maliciously mounted in such places, thereby reducing user privacy invasion incidents.

With reference to the first aspect, in some possible implementations, the determining, based on the MAC address information, whether the target device is a video surveillance device includes: if the MAC address information is first-level MAC address information, determining that the target device is a video surveillance device; or if the MAC address information is not first-level MAC address information, failing to determine whether the target device is a video surveillance device.

In an embodiment provided in this application, whether the target device is an IPC device is identified by determining whether the obtained MAC address information of the target device is first-level MAC address information, thereby reducing time for detecting an IPC device by the electronic device and improving detection efficiency.

With reference to the first aspect, in some possible implementations, the determining, based on first information, whether the target device is a video surveillance device includes: if the port information is first-level port information, determining that the target device is a video surveillance device; or if the port information is second-level port information and the MAC address information is second-level MAC address information, determining that the target device is a video surveillance device.

In an embodiment provided in this application, whether the target device is an IPC device is identified by using the port information of the target device or by using the port information in combination with the MAC address information, so that an IPC can be further and quickly identified based on the port information and the MAC information, thereby reducing time for detecting an IPC device by the electronic device and improving comprehensiveness of detection.

With reference to the first aspect, in some possible implementations, the obtaining fingerprint information of the target device by using a TCP port-based probe protocol includes:
  determining the TCP port-based probe protocol based on the port information;
  sending a probe message to the target device based on the determined probe protocol;
  receiving a response message from the target device; and
  extracting the fingerprint information of the target device based on the response message.

In an embodiment provided in this application, a corresponding probe protocol is determined based on the port information and then a corresponding probe message is sent, and then the fingerprint information is extracted from the received response message, thereby further ensuring accuracy of obtained information and effectively improving detection accuracy.

With reference to the first aspect, in some possible implementations, the TCP port-based probe protocol includes one or more of the web protocol/hypertext transfer protocol (HTTP), the domain name system (DNS) protocol, the Telnet protocol, the file transfer protocol FTP, and the real-time streaming protocol (RTSP).

With reference to the first aspect, in some possible implementations, the obtaining fingerprint information of the target device by using a UDP port-based probe protocol includes:
  sending, based on a preset probe protocol list, a corresponding UDP probe message to an address and a port that correspond to each probe protocol;
  receiving, on a corresponding listening port, a response message returned by the target device; and
  extracting the fingerprint information of the target device based on the response message.

In an embodiment provided in this application, the corresponding UDP probe message is sent, based on the preset probe protocol list, to the address and the port that correspond to each probe protocol, the response message is received on the corresponding listening port, and then the fingerprint information is extracted from the received response message, thereby further ensuring accuracy of obtained information and effectively improving detection accuracy.

With reference to the first aspect, in some possible implementations, the UDP port-based probe protocol includes one or more of the open network video interface forum (ONVIF) protocol, the multicast domain name system (MDNS) protocol, the session initiation protocol (SIP), the domain name system (DNS) protocol, and a proprietary protocol.

With reference to the first aspect, in some possible implementations, the fingerprint information of the target device includes one or more of the following information:
  a device type, device manufacturer information, an IP address, a MAC address, a port status, a port number, a port service type, an application running on a port, a device operating system, and a device-supported service capability of the target device.

With reference to the first aspect, in some possible implementations, the method further includes:
  obtaining assistance information of the target device, where the assistance information includes one or more of the following information: location information, a wireless fidelity service set identifier (Wi-Fi SSID), or a Wi-Fi name; and
  determining, based on the fingerprint information and the assistance information, whether the target device is a video surveillance device.

In an embodiment provided in this application, whether the target device is a video surveillance device is determined based on both the obtained fingerprint information and the obtained assistance information, thereby improving detection accuracy.

With reference to the first aspect, in some possible implementations, the method further includes:
  if no video surveillance device is detected in a currently accessed first wireless access point (AP), switching to a second wireless access point (AP) in the wireless network; and
  determining whether at least one target device connected to the second AP is a video surveillance device.

In an embodiment provided in this application, if the electronic device detects no video surveillance device in the currently accessed first AP, the electronic device switches to the second AP in the wireless network to continue to identify a video surveillance device, thereby improving comprehensiveness of detection.

According to a second aspect, a method for detecting a video surveillance device is provided. The method is applied to an electronic device, and includes: obtaining media access control (MAC) address information of at least one target device, where the electronic device and the target device access a same wireless network; and determining, based on the MAC address information, whether the target device is a video surveillance device.

In an embodiment provided in this application, whether the target device is a video surveillance device is determined by using the MAC address information of the target device, thereby reducing time for detecting an IPC device by the electronic device and improving detection efficiency.

With reference to the second aspect, in some possible implementations, the determining, based on the MAC address information, whether the target device is a video surveillance device includes:
  if the MAC address information is first-level MAC address information, determining that the target device is a video surveillance device; or
  if the MAC address information is not first-level MAC address information, failing to determine whether the target device is a video surveillance device.

With reference to the second aspect, in some possible implementations, the method further includes:
  if whether the target device is a video surveillance device cannot be determined based on the MAC address information, determining, based on first information, whether the target device is a video surveillance device, where the first information includes the MAC address information and port information, or the first information includes the port information, and the port information is obtained based on a status of a port.

In an embodiment provided in this application, if the electronic device cannot determine, based on the MAC address information, whether the target device is a video surveillance device, the electronic device further performs determining based on the first information, thereby improving detection accuracy.

With reference to the second aspect, in some possible implementations, the determining, based on first information, whether the target device is a video surveillance device includes:
  if the port information is first-level port information, determining that the target device is a video surveillance device; or
  if the port information is second-level port information and the MAC address information is second-level MAC address information, determining that the target device is a video surveillance device.

With reference to the second aspect, in some possible implementations, the method further includes:
  if whether the target device is a video surveillance device cannot be determined based on the first information, obtaining fingerprint information of the target device by using a TCP port-based probe protocol or a UDP port-based probe protocol; and
  determining, based on the fingerprint information, whether the target device is a video surveillance device.

In an embodiment provided in this application, if the electronic device cannot determine, based on the first information, whether the target device is a video surveillance device, the electronic device may further perform determining based on the fingerprint information obtained by using the probe protocol, thereby improving detection accuracy.

With reference to the second aspect, in some possible implementations, the method further includes:
  if whether the target device is a video surveillance device cannot be determined based on the MAC address information, obtaining fingerprint information of the target device by using a TCP port-based probe protocol or a UDP port-based probe protocol; and
  determining, based on the fingerprint information, whether the target device is a video surveillance device.

In an embodiment provided in this application, if whether the target device is a video surveillance device cannot be determined based on the MAC address information, determining is performed based on the probe protocol, thereby reducing time for detecting an IPC device by the electronic device and improving detection efficiency.

With reference to the second aspect, in some possible implementations, the obtaining fingerprint information of the target device by using a TCP port-based probe protocol includes:
  determining the TCP port-based probe protocol based on the port information;
  sending a probe message to the target device based on the determined probe protocol;
  receiving a response message from the target device; and
  extracting the fingerprint information of the target device based on the response message.

In an embodiment provided in this application, a corresponding probe protocol is determined based on the port information and then a corresponding probe message is sent, and then the fingerprint information is extracted from the received response message, thereby further ensuring accuracy of obtained information and effectively improving detection accuracy.

With reference to the second aspect, in some possible implementations, the TCP port-based probe protocol includes one or more of the web protocol/hypertext transfer protocol (HTTP), the domain name system (DNS) protocol, the Telnet protocol, the file transfer protocol FTP protocol, and the real-time streaming protocol (RTSP) protocol.

With reference to the second aspect, in some possible implementations, the obtaining fingerprint information of the target device by using a UDP port-based probe protocol includes:
  sending, based on a preset probe protocol list, a corresponding UDP probe message to an address and a port that correspond to each probe protocol;
  receiving, on a corresponding listening port, a response message returned by the target device; and
  extracting the fingerprint information of the target device based on the response message.

In an embodiment provided in this application, the corresponding UDP probe message is sent, based on the preset probe protocol list, to the address and the port that correspond to each probe protocol, the response message is received on the corresponding listening port, and then the fingerprint information is extracted from the received response message, thereby further ensuring accuracy of obtained information and effectively improving detection accuracy.

With reference to the second aspect, in some possible implementations, the UDP port-based probe protocol includes one or more of the open network video interface forum (ONVIF) protocol, the multicast domain name system (MDNS) protocol, the session initiation protocol (SIP) protocol, the domain name system (DNS) protocol, and a proprietary protocol.

With reference to the second aspect, in some possible implementations, the fingerprint information of the target device includes one or more of the following information:
  a device type, device manufacturer information, an IP address, a MAC address, a port status, a port number, a port service type, an application running on a port, a device operating system, and a device-supported service capability of the target device.

With reference to the second aspect, in some possible implementations, the method further includes:
  obtaining assistance information of the target device, where the assistance information includes one or more of the following information: location information, a wireless fidelity service set identifier (Wi-Fi SSID), or a Wi-Fi name; and
  determining, based on the fingerprint information and the assistance information, whether the target device is a video surveillance device.

In an embodiment provided in this application, whether the target device is a video surveillance device is determined based on both the obtained fingerprint information and the obtained assistance information, thereby improving detection accuracy.

With reference to the second aspect, in some possible implementations, the method further includes:
  if no video surveillance device is detected in a currently accessed first wireless access point (AP), switching to a second wireless access point (AP) in the wireless network; and
  determining whether at least one target device connected to the second AP is a video surveillance device.

In an embodiment provided in this application, if the electronic device detects no video surveillance device in the currently accessed first AP, the electronic device switches to the second AP in the wireless network to continue to identify a video surveillance device, thereby improving comprehensiveness of detection.

According to a third aspect, a method for detecting a video surveillance device is provided. The method is applied to an electronic device, and includes: obtaining fingerprint information of at least one target device by using a UDP port-based probe protocol, where the electronic device and the target device access a same wireless network; and determining, based on the fingerprint information, whether the target device is a video surveillance device.

In the technical solution provided in this application, the device fingerprint information of the target device is obtained by using the UDP port-based probe protocol, and matching is performed between the obtained device fingerprint information and a preset fingerprint information base, to determine whether the probed target device is an IPC device. In the technical solution, IPC device detection efficiency can be effectively improved while costs are reduced.

With reference to the third aspect, in some possible implementations, before the obtaining device fingerprint information of at least one target device by using a UDP port-based probe protocol, the method further includes:
obtaining media access control (MAC) address information of the target device;
if the MAC address information is first-level MAC address information, determining that the target device is a video surveillance device;
if the MAC address information is not first-level MAC address information, failing to determine whether the target device is a video surveillance device; and
if whether the target device is a video surveillance device cannot be determined based on the MAC address information, obtaining the device fingerprint information of the target device by using the UDP port-based probe protocol.

In an embodiment provided in this application, before determining, by using the UDP port-based probe protocol, whether the target device is a video surveillance device, the electronic device first performs priori determining based on the obtained MAC address information. If that the target device is a video surveillance device can be determined based on the MAC address information, determining does not need to be performed based on the probe protocol; or if whether the target device is a video surveillance device cannot be determined based on the MAC address information, determining is performed based on the probe protocol, thereby reducing time for detecting an IPC device by the electronic device and improving detection efficiency.

With reference to the third aspect, in some possible implementations, the obtaining fingerprint information of at least one target device by using a UDP port-based probe protocol includes:
sending, based on a preset probe protocol list, a corresponding UDP probe message to an address and a port that correspond to each probe protocol;
receiving, on a corresponding listening port, a response message returned by the target device; and
extracting the fingerprint information of the target device based on the response message.

With reference to the third aspect, in some possible implementations, the UDP port-based probe protocol includes one or more of the following protocols:
the open network video interface forum (ONVIF) protocol, the multicast domain name system (MDNS) protocol, the session initiation protocol (SIP), the domain name system (DNS) protocol, and a proprietary protocol.

With reference to the third aspect, in some possible implementations, the fingerprint information of the target device includes one or more of the following information:
a device type, device manufacturer information, an IP address, a MAC address, a port status, a port number, a port service type, an application running on a port, a device operating system, and a device-supported service capability of the target device.

With reference to the third aspect, in some possible implementations, the method further includes:
obtaining assistance information of the target device, where the assistance information includes one or more of the following information: location information, a wireless fidelity service set identifier (Wi-Fi SSID), or a Wi-Fi name; and
determining, based on the fingerprint information and the assistance information, whether the target device is a video surveillance device.

With reference to the third aspect, in some possible implementations, the method further includes:
if no video surveillance device is detected in a currently accessed first wireless access point (AP), switching to a second wireless access point (AP) in the wireless network; and
determining whether at least one target device connected to the second AP is a video surveillance device.

For beneficial effects of other possible implementations of the third aspect, refer to the beneficial effects of the first aspect. Details are not described herein again.

According to a fourth aspect, a method for detecting a video surveillance device is provided. The method is applied to an electronic device, and includes: obtaining port information of at least one target device, where the electronic device and the target device access a same wireless network; and determining, based on the port information, whether the target device is a video surveillance device.

In an embodiment provided in this application, whether the target device is a video surveillance device is determined by using the port information of the target device, thereby reducing time for detecting an IPC device by the electronic device and improving detection efficiency.

With reference to the fourth aspect, in some possible implementations, the determining, based on the port information, whether the target device is a video surveillance device includes:
if the port information is first-level port information, determining that the target device is a video surveillance device; or
if the port information is not first-level port information, failing to determine whether the target device is a video surveillance device.

With reference to the fourth aspect, in some possible implementations, the method further includes:
if whether the target device is a video surveillance device cannot be determined based on the port information, determining, based on second information, whether the target device is a video surveillance device, where the second information includes MAC address information and the port information, or the second information includes the MAC address information, where the MAC address information is obtained through host discovery.

In an embodiment provided in this application, if the electronic device cannot determine, based on the port information, whether the target device is a video surveillance device, the electronic device further performs determining based on the second information, thereby improving detection accuracy.

With reference to the fourth aspect, in some possible implementations, the determining, based on second information, whether the target device is a video surveillance device includes:
if the MAC address information is first-level MAC address information, determining that the target device is a video surveillance device; or
if the port information is second-level port information and the MAC address information is second-level MAC address information, determining that the target device is a video surveillance device.

With reference to the fourth aspect, in some possible implementations, the method further includes:
if whether the target device is a video surveillance device cannot be determined based on the second information, obtaining fingerprint information of the target device by using a TCP port-based probe protocol or a UDP port-based probe protocol; and
determining, based on the fingerprint information, whether the target device is a video surveillance device.

In an embodiment provided in this application, if the electronic device cannot determine, based on the second information, whether the target device is a video surveillance device, the electronic device may further perform determining based on the fingerprint information obtained by using the probe protocol, thereby improving detection accuracy.

With reference to the fourth aspect, in some possible implementations, the obtaining fingerprint information of the target device by using a TCP port-based probe protocol includes:
determining the TCP port-based probe protocol based on the port information;
sending a probe message to the target device based on the determined probe protocol;
receiving a response message from the target device; and
extracting the fingerprint information of the target device based on the response message.

With reference to the fourth aspect, in some possible implementations, the TCP port-based probe protocol includes one or more of the web/HTTP protocol, the DNS protocol, the Telnet protocol, the FTP protocol, and the RTSP protocol.

With reference to the fourth aspect, in some possible implementations, the obtaining fingerprint information of the target device by using a UDP port-based probe protocol includes:
sending, based on a preset probe protocol list, a corresponding UDP probe message to an address and a port that correspond to each probe protocol;
receiving, on a corresponding listening port, a response message returned by the target device; and
extracting the fingerprint information of the target device based on the response message.

With reference to the fourth aspect, in some possible implementations, the UDP port-based probe protocol includes one or more of the ONVIF protocol, the MDNS protocol, the SIP protocol, the DNS protocol, and a proprietary protocol.

With reference to the fourth aspect, in some possible implementations, the fingerprint information of the target device includes one or more of the following information:
a device type, device manufacturer information, an IP address, a MAC address, a port status, a port number, a port service type, an application running on a port, a device operating system, and a device-supported service capability of the target device.

With reference to the fourth aspect, in some possible implementations, the method further includes:
obtaining assistance information of the target device, where the assistance information includes one or more of the following information: location information, a Wi-Fi SSID, or a Wi-Fi name; and
determining, based on the fingerprint information and the assistance information, whether the target device is a video surveillance device.

With reference to the fourth aspect, in some possible implementations, the method further includes:
if no video surveillance device is detected in a currently accessed first wireless access point (AP), switching to a second wireless access point (AP) in the wireless network; and
determining whether at least one target device connected to the second AP is a video surveillance device.

For beneficial effects of other possible implementations of the fourth aspect, refer to the beneficial effects of the first aspect. Details are not described herein again.

According to a fifth aspect, an apparatus is provided. The apparatus is included in an electronic device, and the apparatus has a function of implementing the behavior of the electronic device in the foregoing aspects and the possible implementations of the foregoing aspects. The function may be implemented by hardware, or may be implemented by hardware executing corresponding software. The hardware or the software includes one or more modules or units corresponding to the foregoing function.

According to a sixth aspect, an electronic device is provided, including one or more processors, a memory, one or more applications, and one or more computer programs. The one or more computer programs are stored in the memory. The one or more computer programs include instructions. When the instructions are executed by the electronic device, the electronic device is enabled to perform A method for detecting a video surveillance device in any one of the first aspect to the fourth aspect or the possible implementations of the first aspect to the fourth aspect.

According to a seventh aspect, a chip system is provided, including at least one processor. When program instructions are executed in the at least one processor, a function of a method for detecting a video surveillance device in any one of the first aspect to the fourth aspect or the possible implementations of the first aspect to the fourth aspect on the electronic device is implemented.

According to an eighth aspect, a computer storage medium is provided, including computer instructions. When the computer instructions run on an electronic device, the electronic device is enabled to perform a method for detecting a video surveillance device in any one of the first aspect to the fourth aspect or the possible implementations of the first aspect to the fourth aspect.

According to a ninth aspect, a computer program product is provided. When the computer program product runs on an electronic device, the electronic device is enabled to perform a method for detecting a video surveillance device in any one of the first aspect to the fourth aspect or the possible designs of the first aspect to the fourth aspect.

DESCRIPTION OF EMBODIMENTS

Figure 1:
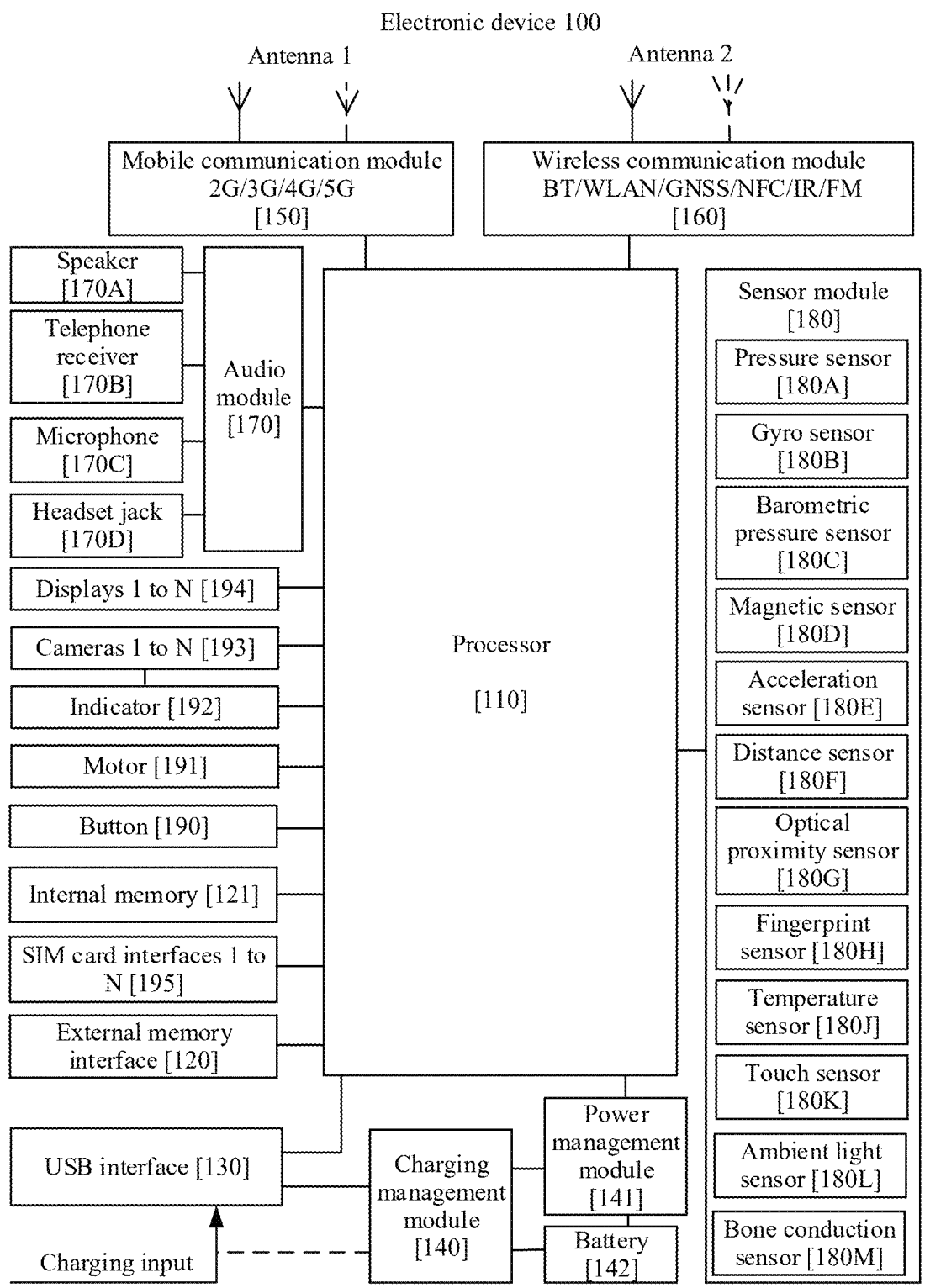
FIG. 1 is a schematic diagram of a hardware structure of an electronic device according to an embodiment of this application.

Terms used in the following embodiments are merely intended to describe respective embodiments, but not to limit this application. The terms "one", "a", and "this" of singular forms used in this specification and the appended claims of this application are also intended to include expressions such as "one or more", unless otherwise specified in the context clearly. It should be further understood that, in the following embodiments of this application, "at least one" and "one or more" mean one, two, or more. The term "and/or" is used to describe an association relationship between associated objects and represents that three relationships may exist. For example, A and/or B may represent the following cases: Only A exists, both A and B exist, and only B exists, where A and B each may be singular or plural. The character "/" usually indicates an "or" relationship between the associated objects.

Reference to "an embodiment", "some embodiments", or the like described in this specification indicates that one or more embodiments of this application include a specific feature, structure, or characteristic described with reference to the embodiment. Therefore, statements such as "in an embodiment", "in some embodiments", "in some other embodiments", and "in other embodiments" that appear at different places in this specification do not necessarily mean referring to a same embodiment, but mean "one or more but not all of embodiments", unless otherwise specifically emphasized in another manner. The terms "include", "comprise", "have", and their variants all mean "include but are not limited to", unless otherwise specifically emphasized in another manner.

The terms "first" and "second" used below are merely intended for a purpose of description, and shall not be understood as an indication or an implication of relative importance or an implicit indication of a quantity of indicated technical features. Therefore, a feature limited by "first" or "second" may explicitly or implicitly include one or more features.

Embodiments of this application provide a method for detecting a video surveillance device. The method is applied to an electronic device. The electronic device obtains MAC address information or port information of a target device that accesses a same wireless network, and obtains fingerprint information of the target device by using a TCP port-based or UDP port-based probe protocol in different cases, to determine whether the target device is a video surveillance device. In the technical solution of this application, for various video surveillance devices on the market, a plurality of detection techniques including the MAC address information, the port information, and the TCP port-based or UDP port-based probe protocol are used to provide a more comprehensive detection solution, thereby effectively improving detection accuracy and reducing a missing detection rate. Scenarios to which the technical solution of this application is applicable may be places such as a hotel lobby and a room. An electronic device in this application can effectively detect secret photography IPCs that are maliciously mounted in such places, thereby reducing user privacy invasion incidents. In addition, a method and an electronic device provided in this application may also be used to detect a common IPC in a home environment.

A method for detecting a video surveillance device in embodiments of this application may be applied to an electronic device such as a mobile phone, a tablet computer, a wearable device, a vehicle-mounted device, an augmented reality (AR)/virtual reality (VR) device, a notebook computer, an ultra-mobile personal computer (UMPC), a netbook, or a personal digital assistant (PDA). A specific type of the electronic device is not limited in embodiments of this application.

For example, FIG. 1 is a schematic diagram of a structure of an electronic device 100. The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a telephone receiver 170B, a microphone 170C, a headset jack 170D, a sensor module 180, a compass 190, a motor 191, an indicator 192, a camera 193, a display 194, a subscriber identification module (SIM) card interface 195, and the like.

It may be understood that the structure shown in this embodiment of this application does not constitute a specific limitation on the electronic device 100. In some other embodiments of this application, the electronic device 100 may include more or fewer components than those shown in the figure, or some components may be combined, or some components may be split, or there may be a different component layout. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

In embodiments of this application, constructing and sending a probe message, constructing a device fingerprint information base, performing matching between obtained device fingerprint information and the fingerprint information base to identify an IPC device, switching a wireless access point, and the like may all be performed by the processor 110.

The controller may generate an operation control signal based on an instruction operation code and a time sequence signal, to complete control of instruction fetching and instruction execution.

In some other embodiments, a memory may be further disposed in the processor 110 to store instructions and data. For example, information about some IPC devices may be stored to form a fingerprint information base. For example, the memory in the processor 110 may be a cache. The memory may store instructions or data that has been used or is cyclically used by the processor 110. If the processor 110 needs to use the instructions or the data again, the processor may directly invoke the instructions or the data from the memory. This avoids repeated access and reduces a waiting time of the processor 110, thereby improving data processing or instruction execution efficiency of the electronic device 101.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a SIM card interface, a USB interface, and/or the like. The USB interface 130 is an interface that conforms to a USB standard specification, and may be specifically a mini USB interface, a micro USB interface, a USB Type-C interface, or the like. The USB interface 130 may be configured to connect to a charger to charge the electronic device 100, or may be configured to transmit data between the electronic device 100 and a peripheral device. The USB interface 130 may alternatively be configured to connect to a headset to play audio by using the headset.

It may be understood that an interface connection relationship between the modules shown in this embodiment of this application is merely an example for description, and does not constitute a limitation on the structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive a charging input from a charger. The charger may be a wireless charger or a wired charger. The power management module 141 is configured to connect to the battery 142, the charging management module 140, and the processor 110. The power management module 141 receives an input from the battery 142 and/or the charging management module 140, and supplies power to the processor 110, the internal memory 121, an external memory, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization.

The mobile communication module 150 may provide a solution applied to the electronic device 100 for wireless communication such as 2G/3G/4G/5G. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules of the mobile communication module 150 may be disposed in the processor 110. In some embodiments, at least some functional modules of the mobile communication module 150 may be disposed in a same device as at least some modules of the processor 110.

The wireless communication module 160 may provide a wireless communication solution that is applied to the electronic device 100 and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module 160 may be one or more devices integrating at least one communication processor module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

The electronic device 100 may implement a display function by using the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the electronic device 100 may include one or more displays 194.

In some embodiments of this application, the display 194 in FIG. 1 is foldable when the display panel is made of a material such as an OLED, an AMOLED, or an FLED. Herein, that the display 194 is foldable means that the display may be folded to any angle at any part and may be maintained at the angle.

The display 194 of the electronic device 100 may be a flexible screen. Currently, the flexible screen attracts much attention because of unique features and huge potential of the flexible screen. Compared with a conventional screen, the flexible screen has features of strong flexibility and foldability, and can provide a user with anew foldability-based interaction mode, to meet more requirements of the user on the electronic device.

The electronic device 100 may implement a photographing function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, RGB or YUV. In some embodiments, the electronic device 100 may include one or more cameras 193.

The digital signal processor is configured to process a digital signal, and may process another digital signal in addition to the digital image signal. For example, when the electronic device 100 selects a frequency, the digital signal processor is configured to perform Fourier transform on frequency energy, and the like.

The video codec is configured to compress or decompress a digital video. The electronic device 100 may support one or more types of video codecs. In this way, the electronic device 100 may play or record videos in a plurality of encoding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, by referring to a mode of transmission between human brain neurons, and may further continuously perform self-learning. Applications such as intelligent cognition of the electronic device 100, for example, image recognition, facial recognition, speech recognition, and text understanding, may be implemented by using the NPU.

The external memory interface 120 may be configured to connect to an external storage card, for example, a microSD card, to extend a storage capability of the electronic device 100. The external storage card communicates with the processor 110 through the external memory interface 120, to implement a data storage function. For example, files such as music and videos are stored in the external storage card.

The internal memory 121 may be configured to store one or more computer programs, and the one or more computer programs include instructions. The processor 110 may run the instructions stored in the internal memory 121, so that the electronic device 101 performs a volume control method in some embodiments of this application, various applications, data processing, and the like. The internal memory 121 may include a program storage area and a data storage area. The program storage area may store an operating system. The program storage area may further store one or more applications (for example, gallery and contacts), and the like. The data storage area may store data (for example, a photo and a contact) created during use of the electronic device 101, and the like. In addition, the internal memory 121 may include a high-speed random access memory, or may include a nonvolatile memory, for example, one or more magnetic disk storage components, a flash memory component, or a universal flash storage (UFS). In some embodiments, the processor 110 may run the instructions stored in the internal memory 121 and/or the instructions stored in the memory that is disposed in the processor 110, to enable the electronic device 101 to perform a volume control method in embodiments of this application, other applications, and data processing. The electronic device 100 may implement audio functions, for example, a music playing function and a recording function, by using the audio module 170, the speaker 170A, the telephone receiver 170B, the microphone 170C, the headset jack 170D, the application processor, and the like.

The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy by using the temperature detected by the temperature sensor 180J.

The touch sensor 180K is also referred to as a "touch panel". The touch sensor 180K may be disposed on the display 194, and the touch sensor 180K and the display 194 form a touchscreen, which is also referred to as a "touch control screen". The touch sensor 180K is configured to detect a touch operation performed on or near the touch sensor. The touch sensor may transmit the detected touch operation to the application processor to determine a type of a touch event. A visual output related to the touch operation may be provided by using the display 194. In some other embodiments, the touch sensor 180K may alternatively be disposed on a surface of the electronic device 100 at a location different from a location of the display 194.

Figure 2:
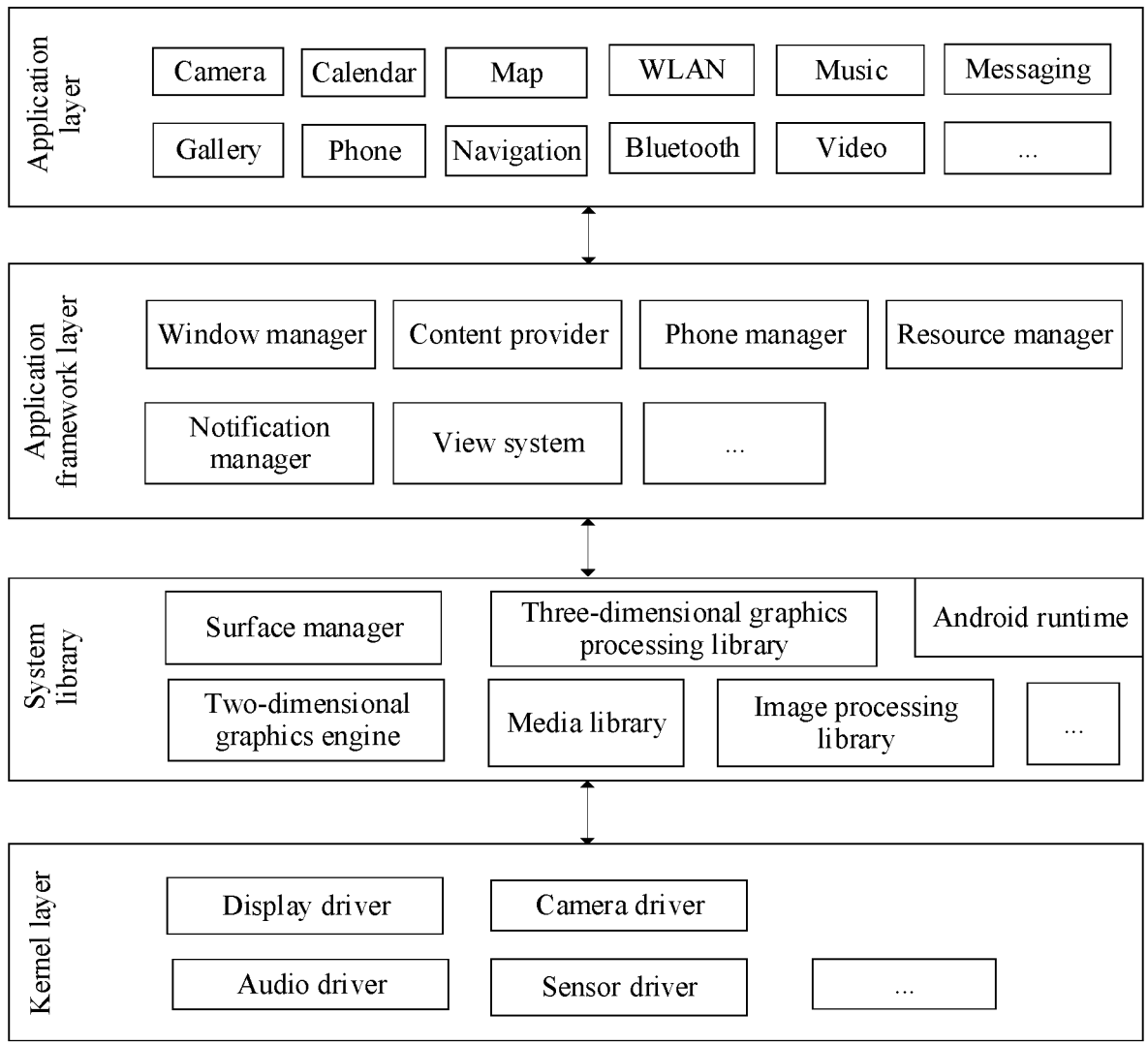
FIG. 2 is a schematic diagram of a software structure of an electronic device according to an embodiment of this application.

FIG. 2 is a block diagram of a software structure of an electronic device 100 according to an embodiment of this application. In a layered architecture, software is divided into several layers, and each layer has a clear role and task. The layers communicate with each other through a software interface. In some embodiments, an Android system is divided into four layers: an application layer, an application framework layer, an Android runtime environment and system library, and a kernel layer from top to bottom. The application layer may include a series of application packages.

As shown in FIG. 2, the application packages may include applications such as Camera, Gallery, Calendar, Phone, Map, Navigation, WLAN, Bluetooth, Music, Video, and Messaging.

The application packages may also include an application of a first application mentioned in the following descriptions.

The application framework layer provides an application programming interface (API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, lock a screen, take a screenshot, and the like.

The content provider is configured to store and obtain data, and enable the data to be accessed by an application. The data may include a video, an image, audio, calls that are made and answered, a browsing history, a bookmark, an address book, and the like.

The view system includes visual controls, such as a control for displaying a text and a control for displaying a picture. The view system may be configured to construct an application. A display interface may include one or more views. For example, a display interface including a message notification icon may include a text display view and a picture display view.

The phone manager is configured to provide a communication function for the electronic device 100, for example, management of a call status (including answering, hanging up, or the like).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without interaction with a user, or may go to a next step through interaction with a user. In this application, the notification manager may notify a user of a message related to detection of a video surveillance device, and the like.

The notification manager may alternatively be a notification that appears in a top status bar of the system in a form of a graph or a scroll bar text, for example, a notification for an application running in the background, or may be a notification that appears on the screen in a form of a dialog window. For example, text information is prompted in the status bar, a prompt tone is played, the electronic device vibrates, or an indicator blinks.

The system library may include a plurality of functional modules, for example, a surface manager, a media library (media libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playing and recording of a plurality of commonly used audio and video formats, static image files, and the like. The media library may support a plurality of audio and video encoding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of an operation process of software and hardware of the electronic device 100 with reference to a scenario in which the first application is started.

When the touch sensor 180K receives a touch operation, a corresponding hardware interrupt is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. For example, the touch operation is a touch tap operation, and a control corresponding to the tap operation is a control of an icon of the first application. The first application invokes an interface of the application framework layer to start the first application, further invokes the kernel layer to start a driver, for example, a Wi-Fi driver, and receives data from another electronic device, for example, Wi-Fi data from a target device, by using the wireless communication module 160.

For ease of understanding of solutions in this application, the following first describes terms used in this application.

Wireless access point (AP): a creator of a wireless network and a central node of a network. Usually, a wireless router used in a home or an office may be considered as an AP.

Figure 3:
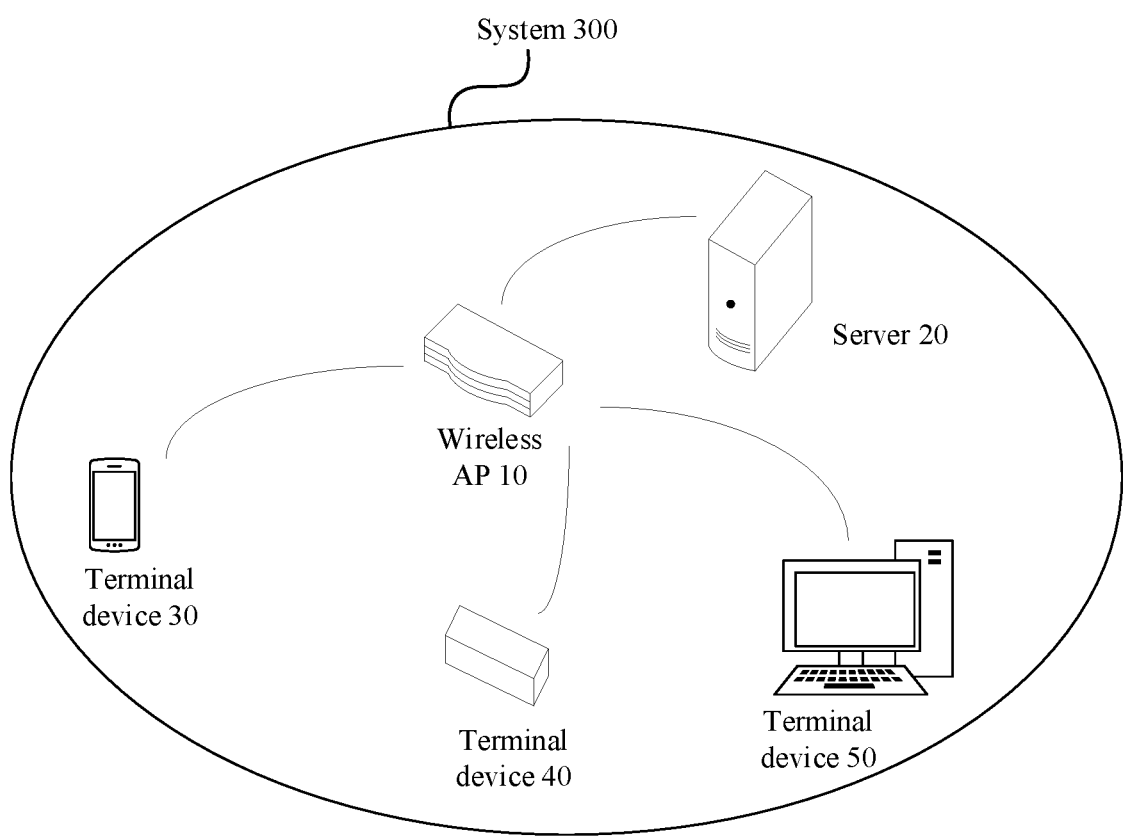
FIG. 3 is a schematic diagram of a wireless communication system according to an embodiment of this application.

FIG. 3 is a schematic diagram of a wireless communication system according to an embodiment of this application. Usually, the wireless communication system may include one or more wireless APs and one or more terminal devices. In FIG. 3, for example, the wireless communication system 300 includes a wireless AP 10, a terminal device 30, a terminal device and a terminal device 50. In addition, the wireless communication system 300 further includes a server 20.

It should be understood that FIG. 3 is only a schematic diagram, and the communication system may further include another network device, for example, may further include a core network device, a wireless relay device, and a wireless backhaul device that are not shown in FIG. 3. Quantities of network devices and terminal devices included in the mobile communication system are not limited in embodiments of this application.

Station (STA): Each terminal device connected to a wireless AP may be referred to as a station, for example, the terminal device 30, the terminal device 40, or the terminal device shown in FIG. 3, or another terminal device or user equipment that can be connected to a network.

Basic service set (BSS): a basic module of an 802.11 local area network (LAN). STAs that can wirelessly communicate with each other may constitute a BSS.

Extension service set (ESS): A plurality of BSSs may constitute an extension network that is referred to as an ESS network and that may be understood a larger-scale virtual BSS including a plurality of BSSs that use a same service set identifier (SSID). STAs in one ESS network may communicate with each other.

Figure 4:
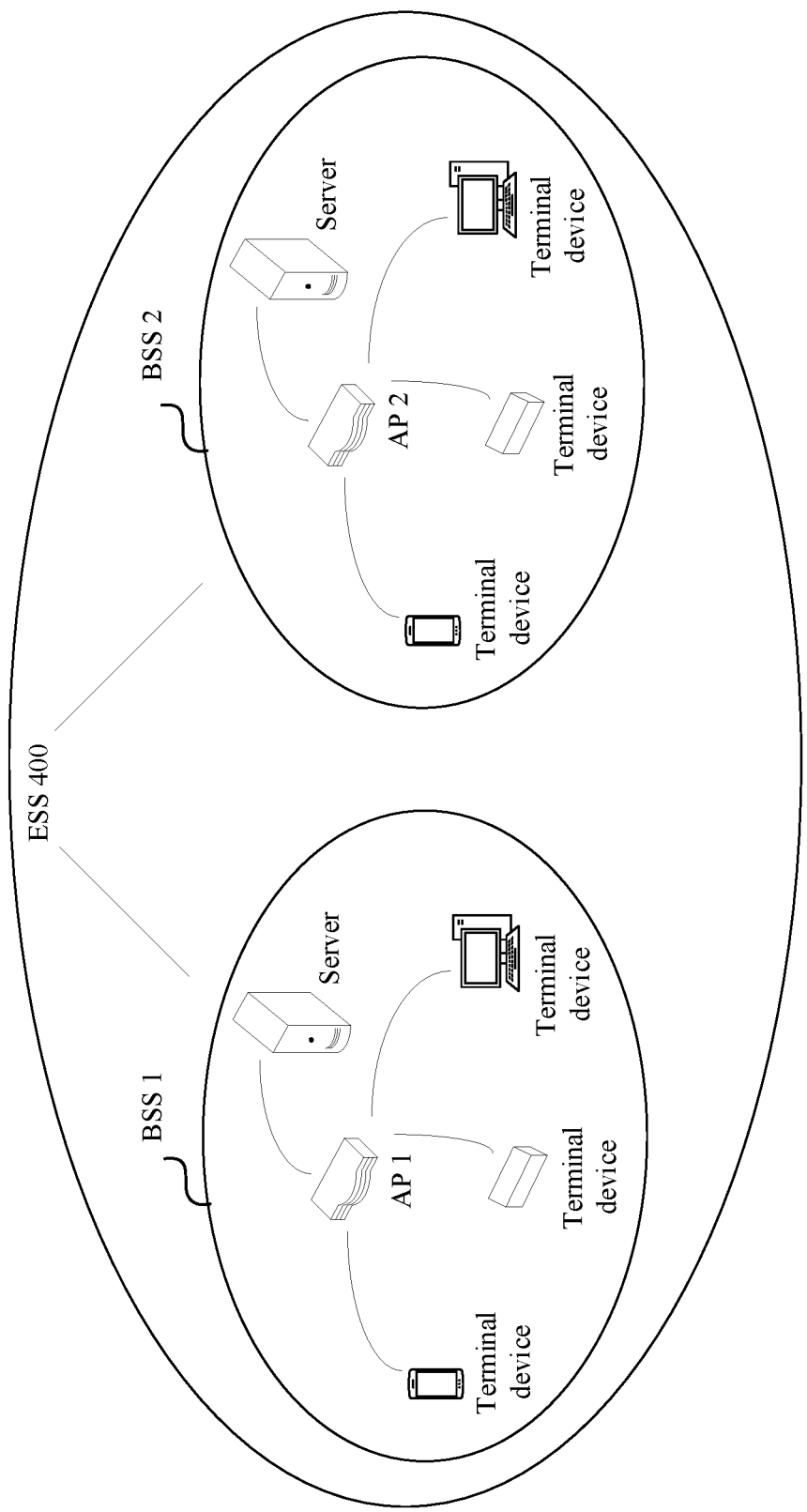
FIG. 4 is a schematic diagram of an extension service set according to an embodiment of this application.

FIG. 4 is a schematic diagram of an ESS 400 according to an embodiment of this application. As shown in FIG. 4, the ESS 400 includes two BSSs (a BSS 1 and a BSS 2).

SSID: an ESS network identifier that may be understood as a Wi-Fi name found by a user through searching by using a network-connected device such as a mobile phone. All APs in one ESS need to have a same SSID; otherwise, the APs cannot communicate with each other.

Basic service set identifier (basic SSID, BSSID): a BSS identifier that is actually a media access control (MAC) address of an AP (router) and that is used to identify a BSS managed by the AP.

The following describes a relationship between an SSID and a BSSID by using an example.

A company has a large area and is equipped with several wireless access points. Employees of the company can access a wireless network anywhere within a range of the company provided that they know an SSID. A BSSID is actually a MAC address of each wireless access point. When an employee moves inside the company, the SSID remains unchanged. However, the BSSID keeps changing when the employee switches to a different wireless access point.

If a router is mounted in a home scenario or the like, the router may constitute a wireless network.

For ease of understanding, in the following embodiments of this application, a method for detecting a video surveillance device in embodiments of this application is described in detail by using a mobile phone with the structures shown in FIG. 1 and FIG. 2 as an example and with reference to accompanying drawings.

FIG. 5(a) to FIG. 5(e) show a group of GUIs of the mobile phone. FIG. 5(a) to FIG. 5(e) show that the mobile phone may detect, in a first application, whether an IPC device (namely, a camera in the figure) exists in a current space.

Figure 5A:
FIG. 5(a) to FIG. 5(e) are a schematic diagram of a group of GUIs according to an embodiment of this application.

With reference to a GUI shown in FIG. 5(a), the GUI is a desktop of the mobile phone. After detecting an operation of tapping, by a user, an icon 501 of the first application on the desktop, the mobile phone may start the first application, and display a GUI shown in FIG. 5(b). The GUI may be referred to as a detection interface.

Figure 5B:
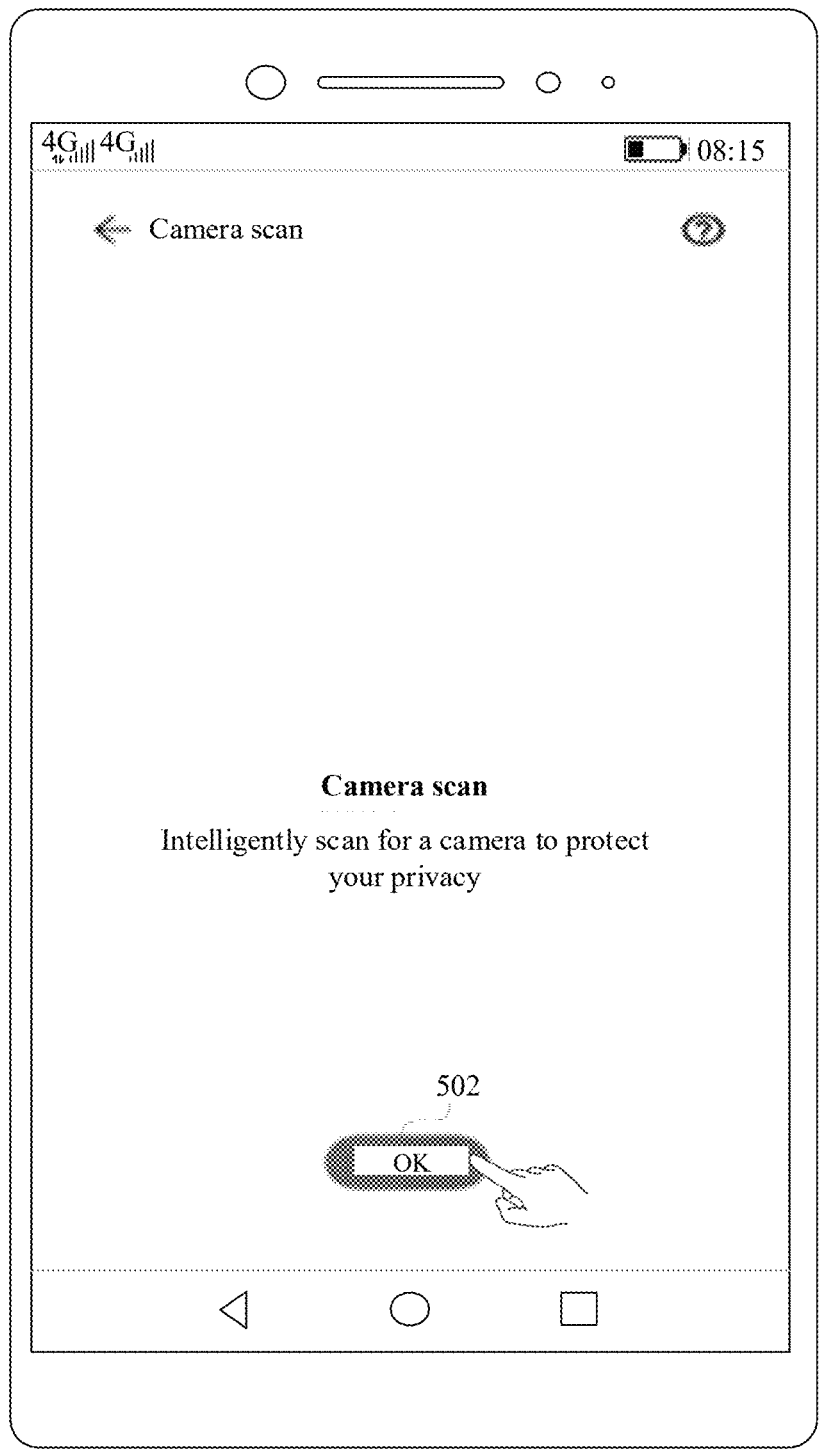
Figure 5C:
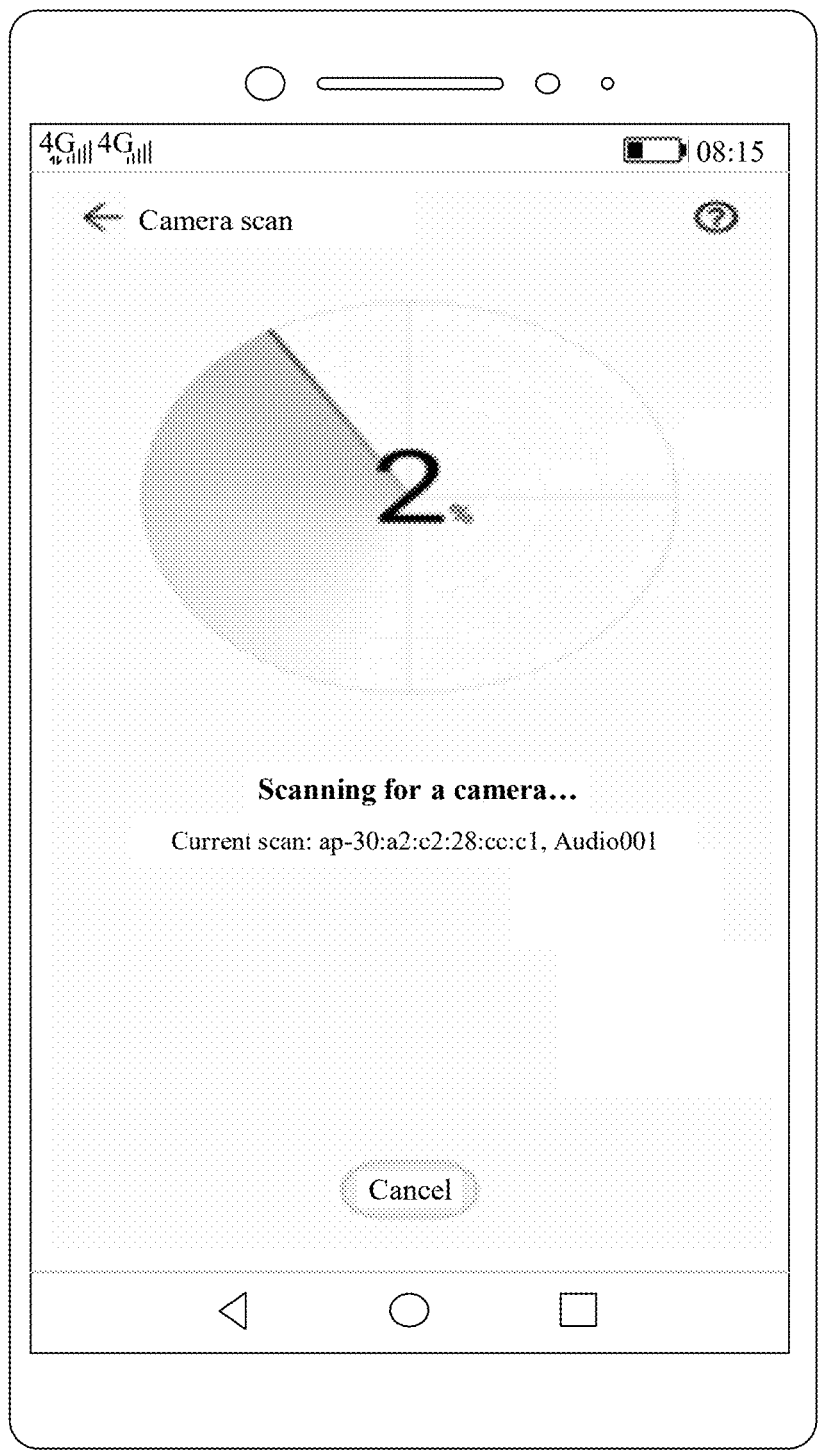
Figure 5D:
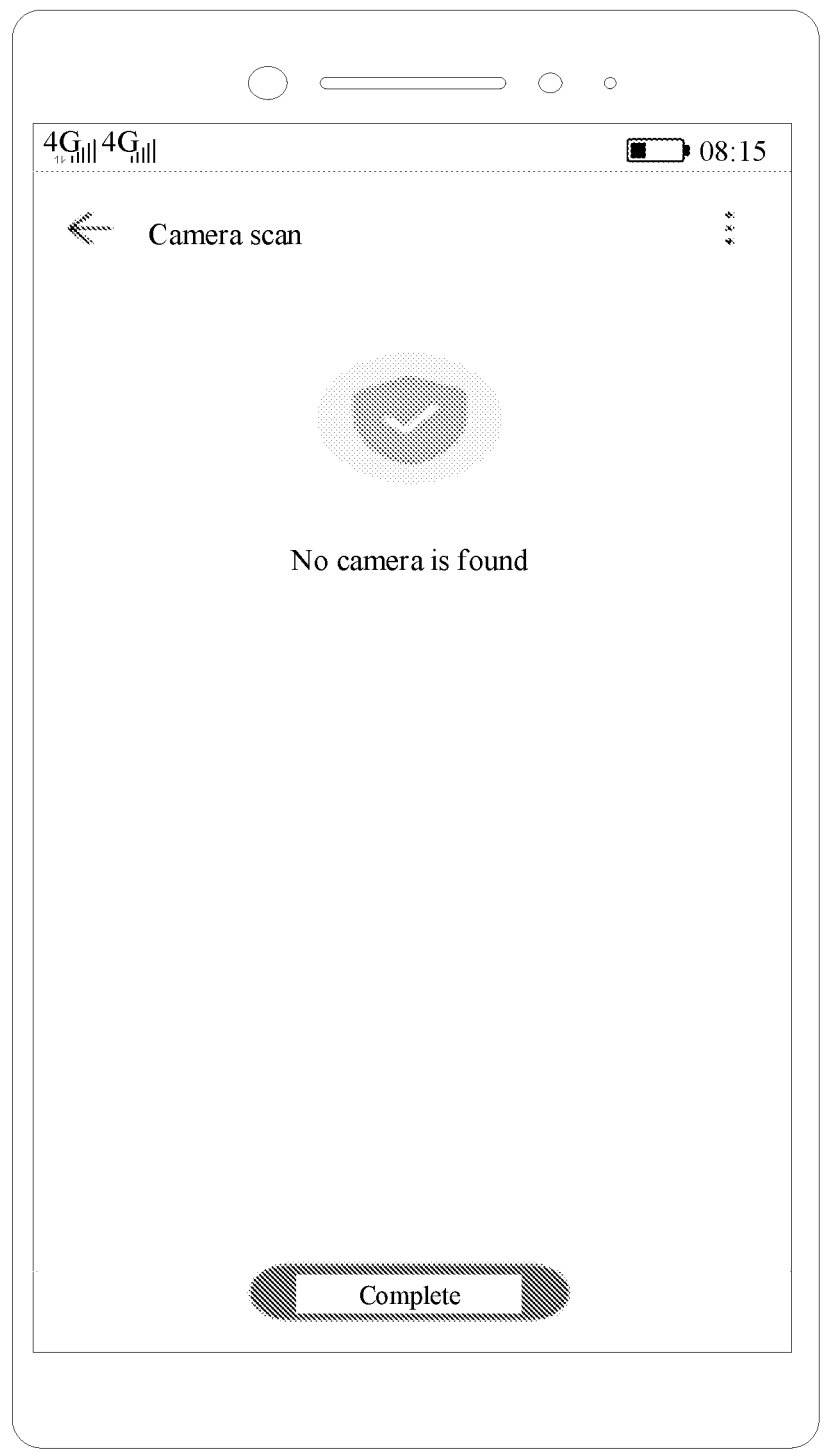
Figure 5E:
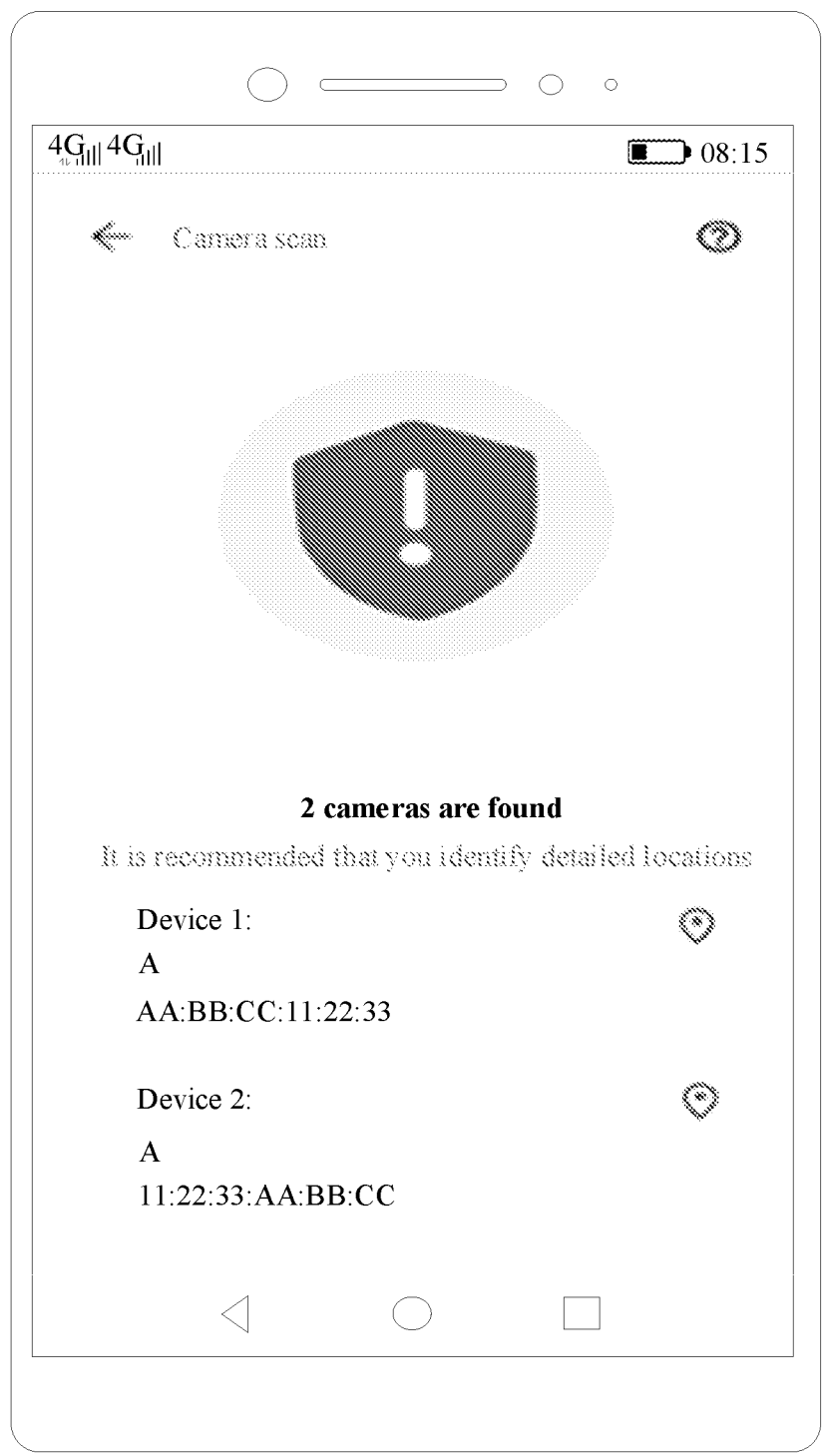

With reference to a GUI shown in FIG. 5(b), after the mobile phone detects an operation of tapping an OK icon 502 by the user, the mobile phone may start to detect whether an IPC device exists in the current space, and display a GUI shown in FIG. 5(c).

With reference to a GUI shown in FIG. 5(c), the GUI is an interface on which the mobile phone is performing scanning. 2% shown in the figure indicates that a detection progress of the mobile phone in this case is 2%. During scanning, information such as an AP currently accessed by the mobile phone, a Wi-Fi name, a MAC address, and a device name may be further displayed in real time.

After the detection progress of the mobile phone is completed, if the mobile phone detects that no IPC device exists in the current network space (which may be a local area network currently accessed by the mobile phone), "No camera is found" may be displayed on an interface of the mobile phone. Refer to a GUI shown in FIG. 5(d).

After the detection progress of the mobile phone is completed, if the mobile phone detects that an IPC device exists in the current network space, "Two cameras are found" may be displayed on an interface of the mobile phone. In addition, detailed information of the detected video surveillance devices (the cameras) may be further displayed, for example, information shown in FIG. 5(e): "Device 1": a name "A" of an accessed network, and MAC address information "AA:BB:CC:11:22:33" of the device; and "Device 2": a name "A" of an accessed network, and MAC address information "11:22:33:AA:BB:CC" of the device.

For the discovered cameras, the first application recommends that detailed locations be identified. When the user taps a device name or a corresponding control on the right of a device name, the selected camera may be further positioned.

It should be noted that, in the foregoing process, a video surveillance device may alternatively be detected through voice. For example, if the mobile phone detects that a video surveillance device exists in the current network space, the mobile phone may prompt, by playing voice, the user that a video surveillance device exists in the current network space; or if the mobile phone detects that no video surveillance device exists in the network space, the mobile phone may prompt, by playing voice, the user that no video surveillance device exists in the current network space. A process is basically the same as the process shown in FIG. 5(a) to FIG. 5(e), except that a display form is different. For brevity, details are not described herein again.

In some embodiments, after the mobile phone of the user is connected to a Wi-Fi network of a hotel or a hostel, the mobile phone may prompt the user to start the first application to detect whether an IPC device exists in a current network space, and display, or indicate through voice, a detection result to the user. Alternatively, after the mobile phone of the user is connected to a Wi-Fi network of a hotel or a hostel, the mobile phone may autonomously detect whether an IPC device exists in a current network space, and display, or indicate through voice, a detection result to the user. A manner of starting the first application to detect an IPC is not limited in this application.

Figure 6:
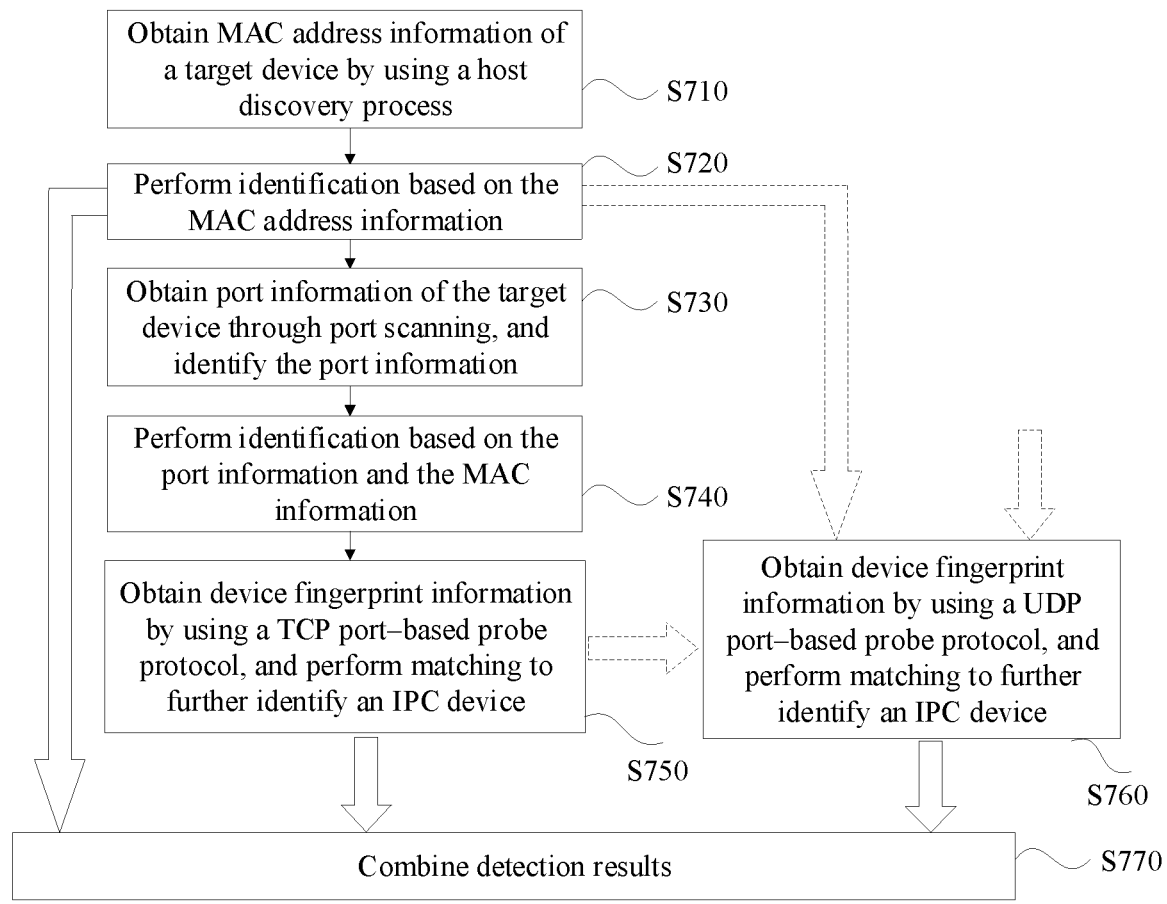
FIG. 6 is a flowchart of an internal algorithm of a detection device according to an embodiment of this application.

With reference to FIG. 6, the following describes an internal implementation process and determining logic of determining, by an electronic device, whether an IPC device exists in embodiments of this application. To distinguish between functions of the electronic device and a target device, an electronic device used for detecting a target device such as an IPC is referred to as a "detection device" in the following descriptions. FIG. 6 is a flowchart of an internal algorithm of a detection device according to an embodiment of this application.

Embodiment 1

S710: The detection device obtains MAC address information of a target device by using a host discovery process.

In this embodiment of this application, a protocol in an open system interconnection model (OSI) is used for host discovery. Usually, the detection device uses the address resolution protocol (ARP) at a data link layer or the internet control message protocol (ICMP) at a network layer to determine whether a network accessed by the detection device includes an active target device (that is, a device that accesses the network and that is in a normal operation state), and records an internet protocol (IP) address of the active target device; or may use another protocol that can implement a ping function to determine whether another active target device exists. Then the detection device obtains, by using the ARP protocol, a MAC address corresponding to each target device.

S720: Perform matching and identification on the obtained MAC address information corresponding to each target device.

The detection device performs, based on a MAC information base, matching and identification on an obtained MAC address corresponding to each target device. Information in the MAC information base includes but is not limited to MAC identification information corresponding to a Wi-Fi manufacturer and a level corresponding to the MAC identification information. A plurality of pieces of MAC identification information included in the MAC information base may be classified into different levels based on different manufacturers, and different levels represent probabilities that a corresponding device is an IPC device.

For example, MAC addresses corresponding to manufacturers A and B may be classified as a level 1, MAC addresses corresponding to manufacturers C and D may be classified as a level 2, and MAC addresses corresponding to a manufacturer E may be classified as a level 3. A higher level (for example, the level 1) indicates a higher probability that the device is an IPC device, and a lower level (for example, the level 3) indicates a lower probability that the device is an IPC device. If the detection device obtains MAC addresses of four target devices (a target device 1, a target device 2, a target device 3, and a target device 4), the following assumptions are made: It is determined, through matching against information in a specific MAC information base, that a MAC address of the target device 1 is a MAC address corresponding to the manufacturer A; it is determined, through matching, that MAC addresses of the target device 2 and the target device 3 are a MAC address corresponding to the manufacturer C and a MAC address corresponding to manufacturer D respectively; and it is determined, through matching, that a MAC address of the target device 4 is a MAC address corresponding to the manufacturer E. In this case, it may be determined that a level of the target device 1 is the level 1, and the target device 1 is probably an IPC device. The detection device may notify a user that the target device 1 is an IPC device. Levels of the target device 2 and the target device 3 are the level 2, a level of the target device 4 is the level 3, and whether the target devices 2 to 4 are IPC devices may be further determined.

After performing matching and identification based on the obtained MAC address and the information in the MAC information base, the detection device determines whether the target device is an IPC device. If that the target device is an IPC device can be determined, the detection device may notify the user that an IPC device exists in the current space. If whether the target device is an IPC device cannot be determined, the detection device may further determine, by using other information (port information, information obtained by using a TCP port-based probe protocol, or information obtained by using a UDP port-based probe protocol), whether the target device is an IPC device.

S730: Obtain port information of the target device through port scanning, and identify the port information.

The detection device may obtain the port information of the target device through transmission control protocol (TCP)/user datagram protocol (UDP) port scanning. The detection device constructs a TCP probe message or a UDP probe message and sends the message to the target device, and then determines, based on a response status of the target device for the probe message, whether a port of the target device is in an open state, to obtain an open port list corresponding to the target device. For example, the detection device sends a TCP connection request to a port number of the target device. If an RST response returned by the target device is received, it is determined that the port of the target device is in a disabled state. If an acknowledgement character (ACK) response is received, the port is in an open state.

The port list may be a list of a fixed quantity of ports that are set based on common protocol types, for example, may be set based on a quantity of TCP or UDP ports. Alternatively, the port list may be a dynamic port list updated based on a result of each/historical detection. The port list may be updated and scanned in the following manners:

(1) Whether the port list is to be adjusted may be determined based on a result of historical (a preset quantity of times of) detection.

The detection device may retain a number of a frequently used or open service port of an IPC device that is detected each time, and delete other port numbers, to update the port list; or the detection device may update the port list based on a quantity of times of detection, detection duration, and a quantity of detected IPCs. For example, if duration of each detection exceeds a specific threshold or a quantity of target devices on which determining needs to be performed exceeds a specific threshold, the port list is refreshed, for example, a port that is less frequently used is deleted.

(2) A port scanning policy is adjusted.

The detection device may divide ports in the port list based on priorities, for example, may divide the ports into a port with a high priority and a port with a low priority (this may be defined based on expert experience or dynamically adjusted based on historical detection results); and perform at least one scan on the port with a high priority, perform one scan or a random sampling-based scan on the port with a low priority, or the like.

After obtaining the port information of the target device, the detection device performs matching between the port information of the target device with port information in a port information base, to further identify whether the target device is an IPC device. The port information in the port information base includes but is not limited to a port number related to video transmission. Similarly, a plurality of pieces of port information in the port information base may also be classified into different levels based on port numbers, and different levels represent probabilities that a corresponding device is an IPC device. For example, ports may be classified into a level 1, a level 2, a level 3, and the like based on one port number or a combination of a plurality of port numbers. A higher level (for example, the level 1) indicates a higher probability that the device is an IPC device, and a lower level (for example, the level 3) indicates a lower probability that the device is an IPC device.

It is assumed that the port information in the port information base includes three types of port information: X, Y, and Z, where the X type of port information is classified as level-1 port information, for example, the X type of port information includes an X1 port number; the Y type of port information is classified as level-2 port information, for example, the Y type of port information includes a port number or a combination of port numbers such as Y1, Y2+Y3, and Y2+Y4+Y5; and the Z type of port information is classified as a level-3 port for example, the Z type of port information includes a port number or a combination of port numbers such as Z1 and Z2+Z5.

That the detection device obtains the MAC addresses of the target devices 1 to 4 in S720 is still used as an example. If a port number of the target device 2 is X1, it is determined, through matching between the port number and the port information in the port information base, that the target device 2 includes level-1 port information. In this case, it may be determined that the target device 2 is an IPC device, and the detection device may notify the user that the target device 2 is an IPC device. If the port numbers of the target device 3 and the target device 4 are Y1 and Y2+Y3 respectively, it is determined, through matching against the port information in the port information base, that both the target device 3 and the target device 4 include level-2 port information. In this case, whether the target device 3 and the target device 4 are IPC devices may be further identified with reference to the MAC address information based on a subsequent step S740, or may be further identified by using a probe protocol based on a subsequent step S750 or S760.

In some embodiments, after the port information is obtained, a port opening status of a corresponding target device may be determined. Further, a specific application running on an open port and version information may be determined through version detection; or information such as a type of an operating system running on the target device and a type of the target device may be detected through operating system (OS) probing. Then this type of information is used as one or more types of device fingerprint information, and may be used in combination with the previously obtained device fingerprint information such as the MAC and the port. Whether the corresponding device is an IPC device is determined by using the obtained device fingerprint information.

S740: Identify an IPC device by using the port information and the MAC address information.

In some embodiments, whether the target device is an IPC device may alternatively be identified with reference to the MAC address information and the port information. If whether a corresponding target device is an IPC device cannot be determined based on port information, determining is further performed based on the port information and a MAC address.

That the detection device obtains the MAC addresses of the target devices 1 to 4 in S720 is still used as an example. In step S730, both the target device 3 and the target device 4 include the level-2 port information. Because a device belonging to this level is probably an IPC device, the target device 3 and the target device 4 may be IPC devices. Further, determining may be performed with reference to the MAC address information of the target devices. In step S720, it is determined, through matching, that the MAC address information of the target device 3 is a level-2 MAC address in the specific MAC information base, and it is determined, through matching, that the MAC address information of the target device 4 is a level-3 MAC address. Because both the MAC address information and the port information of the target device 2 belong to the level 2, it may be determined that the target device 3 is an IPC device, and the detection device may notify the user that the target device 3 is an IPC device.

By performing steps S710 to S740, the detection device identifies that the target device 1, the target device 2, and the target device 3 are all IPC devices, and further identification may be performed on the target device 4 based on information obtained by using a TCP port-based probe protocol and/or a UDP port-based probe protocol in step S750 or S760.

S750: Obtain device fingerprint information by using the TCP port-based probe protocol, and perform matching between the device fingerprint information and a constructed device fingerprint information base, to further identify an IPC device.

The TCP port-based probe protocol may include one or more of the web protocol/hypertext transfer protocol (Http), the domain name system (DNS) protocol, the Telnet protocol, the file transfer protocol (FTP), and the real-time streaming protocol (RTSP).

Specifically, for each target device, an open port list corresponding to the target device may be obtained based on step S730. If the open port list includes a first port (for example, a port 23) corresponding to the Telnet protocol, a Telnet-based probe mode is used. To be specific, the detection device sends a Telnet probe request to the first port of the target device, and waits for receiving a returned response message. If the open port list includes a second port (for example, a port 21) corresponding to the FTP protocol, an FTP-based probe mode is used. To be specific, the detection device sends an FTP probe request to the second port of the target device, and waits for receiving a returned response message. If the open port list includes a third port (for example, a port 554) corresponding to the RTSP protocol, an RTSP-based probe mode is used. To be specific, the detection device sends an RTSP probe request to the third port of the target device, and waits for receiving a returned response message. If the open port list includes a fourth port (for example, a port 53) corresponding to the DNS protocol, a DNS-based probe mode is used (or this mode may be directly used without determining whether the fourth port exists). To be specific, the detection device sends a DNS reverse query request to a router AP or another DNS server of a network accessed by the detection device, and waits for receiving a returned response message. If the open port list includes a fifth port (for example, a port 80, a port 81, or a port 8000) corresponding to the HTTP protocol or the list includes another port, a web/HTTP-based probe mode is used. To be specific, the detection device sends an HTTP probe request (for example, GET or POST) to the first port of the target device, and waits for receiving a returned response message.

If the detection device receives a response message based on the foregoing various TCP protocol-based probe modes, the detection device processes the corresponding response message in a corresponding fingerprint extraction manner, to determine whether valid fingerprint information that can match a fingerprint database exists. One fingerprint database may be set for each probe mode, or one fingerprint database may be set for a plurality of probe modes, or one fingerprint database may be set for all probe modes. If valid fingerprint information exists, it is determined that the target device is an IPC device; otherwise, determining needs to be further performed in another manner (for example, in a subsequent step S760).

For example, an example in which the device fingerprint information is obtained in the RTSP-based probe mode is used for description. For details, refer to the following descriptions.

The RTSP is a text-based application layer protocol. Usually, the RTSP is not used to transmit streaming media data, but is used to control streaming media (for exampling, play and pause). Request messages provided in this protocol include the following methods: available method querying (OPTIONS), media initialization/session description (DESCRIBE), session setup (SETUP), playing (PLAY), recording (RECORD), session description updating (ANNOUNCE), server redirection (REDIRECT), and parameter information obtaining (GET_PARAMETER).

The OPTIONS, the DESCRIBE, the SETUP, the ANNOUNCE, the REDIRECT, and the GET_PARAMETER may represent the following meanings:

OPTIONS: This message may be sent by any end to obtain a list of methods supported by a peer end.

DESCRIBE: This message is sent by a client and may be used to obtain media description information specified in a URL, for example, IP or a media type+a port number+a transmission protocol. Usually, the SDP protocol may be used for description.

SETUP: This message is sent by a client and may be used to negotiate upon a transmission mode (for example, the real-time transport protocol (RTP), unicast, or a port) or create an RTSP session (or change a transmission parameter for a media stream being played).

ANNOUNCE: Optionally, if this message is sent by a server sends the message, this message may be used to update a session description in real time; or if this message is sent by a client, this message may be used to submit media description information specified in a URL to a server.

REDIRECT: This message is sent by a server and may be used to indicate a client to connect to another server location. A command carries a URL of a new target. If the client needs to continue to send or receive a media stream, the client may be disconnected (Teardown) from the original server and then establish (setup) a connection to the new server.

GET_PARAMETER: Optionally, this message may be sent by any end to obtain a media stream parameter value specified in a URL (a session ID is required, and authentication may be required). A command without a body may be used to test whether a peer end is active.

In this embodiment of this application, the REDIRECT and the SETUP defined in the RTSP protocol are mainly used, and the detection device, as a server defined in the protocol, sends a corresponding probe message to another device (which may be the target device determined based on the foregoing steps) connected to the AP, extracts device fingerprint information after receiving a corresponding response message, and then determines, based on a constructed device fingerprint database, whether the target device is an IPC device. In addition, the detection device may further determine whether there is another AP that is not probed in the network. If yes, the detection device switches from the current AP to a next AP to continue to perform the foregoing probing.

Figure 7:
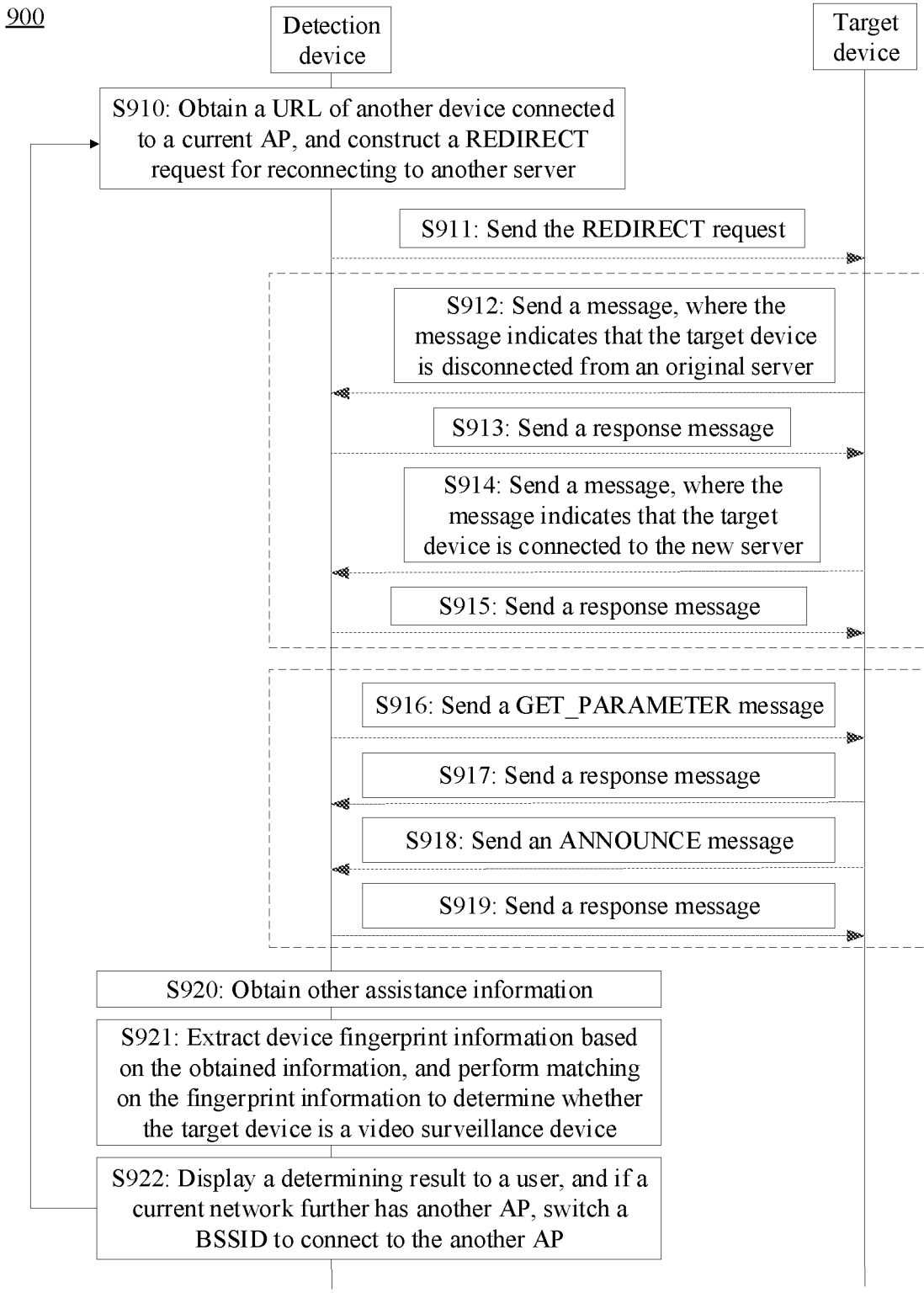
FIG. 7 is a schematic diagram of interaction between a detection device and a target device in an RTSP-based probe mode according to an embodiment of this application.

Specifically, that the detection device obtains the fingerprint information of the target device in the RTSP-based probe mode is described in detail below with reference to a diagram of interaction between the detection device and the target device shown in FIG. 7. FIG. 7 may include steps S910 to S918.

S910: Obtain a URL of another device connected to the current AP, and construct a REDIRECT request for reconnecting to another server.

The another device in this step may be a target device obtained by using the host discovery process described in step S710, or may be a target device that is obtained by using the port scanning process described in step S730 and whose specific port (for example, 554) is in an open state.

In this step, the URL may be obtained through construction based on an IP address and an open port of the device and according to an RTSP service address naming rule of a mainstream IPC manufacturer; or obtained based on a device discovery process or a media capability/media stream URL obtaining process of the open network video interface forum (ONVIF) protocol, or the like. A manner of obtaining the URL is not limited in this embodiment of this application.

S911: The detection device sends a REDIRECT request to the target device.

As described above, the REDIRECT request may be used to indicate the target device to connect to another server location. A command may carry a URL of a new target. If the target device needs to continue to send or receive a media stream, the target device may be disconnected from the original server and then establish a connection to the new server.

S912: The target device sends a message to the detection device, where the message indicates that the target device is disconnected from the original server.

The message may be a TEARDOWN message, and includes information such as a URL of the original server and an identifier of an original session.

S913: The detection device sends a response message to the target device.

The response message may be 200 ok, and is used to indicate that the target device has received the message indicating that the target device is disconnected from the original server.

S914: The target device sends a message to the detection device, where the message indicates that the target device is connected to the new server.

The message may be a SETUP message, and includes information such as the URL of the new server, a type of a transmission protocol used for transmitting a media stream, a transmission mode, and a transmission port.

S915: The detection device sends a response message to the target device.

The response message may be 200 ok, may include information such as an identifier of a new session and a type of a transmission protocol used for transmitting a media stream, a transmission mode, and a transmission port that are negotiated upon by both parties, and is used to indicate that the target device has received the message indicating that the target service is connected to the new server.

Optionally, the detection device may further obtain streaming media information, such as an address/port, a media type, and a transmission protocol, of the target device in a manner described in steps S916 and S917 or in a manner described in steps S918 and S919.

S916: The detection device sends a GET_PARAMETER message to the target device.

As described above, the GET_PARAMETER message may be used to obtain a media stream parameter value specified in the URL of the target device (a session ID is required, and authentication may be required).

S917: The target device sends a response message to the detection device.

The response message may be 200 ok, and the message may include streaming media information of the target device, and the like.

S918: The target device sends an ANNOUNCE message to the detection device.

As described above, the ANNOUNCE message may enable the target device to submit media description information specified in the URL to the detection device when sending the ANNOUNCE message.

S919: The detection device sends a response message to the target device.

The response message may be 200 ok, and the message indicates that the streaming media information of the target device has been received.

It should be noted that steps S916 and S917 and steps S918 and S919 are both intended to obtain the streaming media information of the target device. Therefore, steps S916 and S917 and steps S918 and S919 may coexist, or may exist independently. To be specific, the detection device may obtain the streaming media information of the target device by using steps S916 and S917, or may obtain the streaming media information of the target device by using steps S918 and S919, or may obtain the streaming media information of the target device by using steps S916 and S917 and steps S918 and S919. This is not limited in this application.

S920: The detection device obtains other assistance information.

The assistance information may be global positioning system (GPS) location information or a Wi-Fi S SID or name (for example, xxx hotel/hotel) of the probed target device.

S921: The detection device extracts device fingerprint information based on the obtained information, and performs matching on the fingerprint information to determine whether the target device is a video surveillance device.

In this manner, the extracted device fingerprint information may include a type of the target device, the type of the transmission protocol, the transmission mode, the IP address, a supported media type, and the like.

In a specific implementation, matching may be performed in the following manners.

(1) Matching is performed based on a keyword.

Specifically, the device fingerprint information base may include but is not limited to: device type information, where the device type information may be, for example, a keyword such as an IPC, an IPCam (which may also be referred to as an IP network camera), a camera, or a network video transmitter, or other information that represents a device type; MAC information, where the MAC information may be a MAC (the first half part of fields) list, a MAC manufacturer list, or the like; IP information, where the IP information may be an IP list, a related location, or a network area to which the device belongs; port information, where the port information may be a port number list, a corresponding port service type list; and transmission protocol type information, media type information, and the like.

Assuming that the device type information of the target device detected in the foregoing steps includes keyword information such as the camera, it may be determined that the target device is an IPC device. Alternatively, if the MAC address of the target device detected in the foregoing steps corresponds to a specific manufacturer, it may be determined that the detected target device is an IPC device. Alternatively, if the port information of the target device detected in the foregoing steps includes a specific port (for example, the port 554), it may be determined that the detected target device is an IPC device. Alternatively, if the protocol type of the detected target device is a video-related protocol, such as the ONVIF protocol or the GB/T 28181/session initiation protocol (SIP), or if the supported transmission protocol is a streaming media dedicated transmission protocol, such as the RTP, it may be determined that the detected target device is an IPC device.

(2) Matching is performed based on a similarity calculation method.

The similarity calculation method may include but is not limited to one or more of the following methods: a cosine similarity, a Pearson correlation coefficient, a Jaccard correlation coefficient, mutual information/information gain, and the like.

The cosine similarity is used as an example for description. In the cosine similarity, a cosine value of an included angle between two vectors is calculated to evaluate a similarity between the two vectors. In the cosine similarity, a vector is drawn into a vector space based on coordinate values.

A similarity between two vectors may be determined based on cosine value of an angle between the two vectors. When a cosine value of an angle between two vectors is 1, it indicates that the two vectors have a same direction and have a high similarity. When a cosine value of an angle between two vectors is 0, it indicates that the two vectors are independent of each other. When a cosine value of an angle between two vectors is −1, it indicates that the two vectors have opposite directions and have a quite low similarity, or it may be considered that the two vectors are completely dissimilar.

A cosine value between two vectors may be calculated by using a formula (1):

$$\cos\theta = \frac{A*B}{\|A\|*\|B\|} = \frac{\sum_{i=1}^{n} A_i * B_i}{\sqrt{\sum_{i=1}^{n}(A_i)^2} * \sqrt{\sum_{i=1}^{n}(B_i)^2}} \quad (1)$$

The foregoing device fingerprint information of the target device may be used as a component of A. For example, the type information of the detected target device may be $A_1$, the MAC information of the detected target device may be $A_2$, and so on. The foregoing device fingerprint information base may be used as a component of B. For example, the device type information may be $B_1$, the MAC information may be $B_2$, and so on.

(3) Matching is performed based on a distance calculation method.

The distance calculation method may include but is not limited to one or more of the following methods: a Euclidean distance, a Mahalanobis distance, a Manhattan distance, a Chebyshev distance, a Hamming distance, and the like.

The Euclidean distance is used as an example for description. The Euclidean distance (which may also be referred to as a Euclidean measure or a Euclidean distance) is a commonly used distance definition that indicates a real distance between two points in an n-dimensional space. A Euclidean distance in a two-dimensional or three-dimensional space is an actual distance between two points.

The Euclidean distance (denoted as ρ in the following descriptions) may be calculated based on the following formula (2):

$$\rho = \sqrt{(x_1 - y_1)^2 + (x_2 - y_2)^2 + \ldots + (x_n - y_n)^2} = \sqrt{\sum_{i=1}^{n}(x_i - y_i)^2} \quad (2)$$

The foregoing device fingerprint information of the target device may be used as a component of x. For example, the type information of the detected target device may be $x_1$, the MAC information of the detected target device may be $x_2$, and so on. The foregoing device fingerprint information base may be used as a component of y. For example, the device type information may be $y_1$, the MAC information may be $y_2$, and so on.

Specifically, an n-dimensional coordinate system may be first constructed. Coordinates of the target device and the detection device may be separately drawn in the n-dimensional coordinate system, and a Euclidean distance between the target device and the detection device is calculated by using the foregoing formula (2). Whether the detected target device is an IPC device is determined based on the calculated Euclidean distance.

(4) Matching is performed by superposing weights of a plurality of features.

Weights may be allocated to different features. For example, a weight of a keyword matching rate is w1, a weight of a MAC matching rate is w2, a weight of an IP matching rate is w3, a weight of a port matching rate is w4, and so on.

Specifically, matching may be performed on each feature of the target device, and then matching rates of features are multiplied by corresponding weights and then added up. If a value obtained through addition is greater than or equal to a preset threshold, it may be considered that the target device is an IPC device, and a corresponding risk prompt is given (for example, a text prompt, a picture prompt, or a voice prompt is provided by using a user interface); otherwise, it may be considered that the target device is not an IPC device. Certainly, some weight limit cases may also be set. For example, weights of some keywords, some MAC information, and some port information may be 100%.

For example, it is assumed that the preset threshold is 100. An authentication value of the target device is obtained by performing weighted summation on a plurality of features of the target device that are obtained. If the authentication value is greater than or equal to 100, it may be considered that the target device is an IPC device, and a user is prompted that a risk device currently exists in a surrounding area. If the authentication value is less than the preset threshold 100, it may be considered that the target device is not an IPC device.

(5) Matching is performed based on a constructed algorithm model.

Specifically, a test sample may be constructed by using the device fingerprint information, and then a machine learning (ML) algorithm model and/or a deep learning (DL) algorithm model are used to perform inference and determining on the sample. The ML algorithm model or the DL algorithm model may be obtained through training based on a large quantity of positive and negative sample sets.

For example, heartbeat data exchanged between an IPC device and a server in a network-connected non-live state is used as a positive sample for extracting features (for example, features such as a heartbeat cycle/frequency, heartbeat duration, a quantity of heartbeats in a specific time period, and a target address), data exchanged in another state or data exchanged between a non-IPC device and an external environment is used as a negative sample for exacting features, and then algorithm training is performed. For another example, data exchanged between an IPC device and a server in a network-connected live state is used as a positive sample for extracting features, data exchanged in another state or data exchanged between a non-IPC device and an external environment is used as a negative sample for extracting features, and then algorithm training is performed.

S922: The detection device displays a determining result to the user, and if the current network further has another AP, switches a BSSID to connect to the another AP.

After fingerprint matching is performed in the foregoing manner and whether the target device is an IPC device is determined, the determining result may be displayed to the user. For example, as described above, if the detected target device is an IPC device, a risk prompt may be provided for the user, for example, the texts "Two cameras are found" displayed in FIG. 5(*e*); or if the detected target device is not an IPC device, a prompt may also be provided for the user to indicate that there is no risk in a current surrounding environment, for example, the texts "No camera is found" displayed in FIG. 5(*d*).

In addition, when switching the BSSID to connect to the another AP, the detection device may obtain information such as a corresponding SSID, a BSSID list, and signal strength in the network by using a system service (for example, Wi-Fi management in an Android system), and the detection device may sort BSSIDs based on the information such as the signal strength and the SSID.

It should be noted that, in this step, the detection device may alternatively determine, based on a detection result in steps S910 to S921, whether to switch the BSSID. For example, if no IPC device is detected in the foregoing steps, the BSSID may be switched to continue to perform detection; otherwise, no switching is performed.

In some embodiments, the detection device may alternatively obtain target information based on a method list obtaining process defined in the RSTP, that is, send an OPTIONS command, mainly to determine whether the peer target device returns methods/commands supported by the target device, so as to determine whether the target device is an IPC device; or obtain target information based on a parameter obtaining process defined in the RTSP, that is, send a GET_PARAMETER command, to test whether the peer target device is active, so as to determine whether the target device is an IPC device.

S760: Obtain device fingerprint information by using the UDP port-based probe protocol, and perform matching between the device fingerprint information and a constructed device fingerprint information base, to further identify an IPC device.

It should be noted that step S760 is not necessarily performed under the condition that steps S720 to S750 are performed. S760 may be directly performed after S710, to be specific, the device fingerprint information is obtained by using the UDP port-based probe protocol after the host discovery process. Alternatively, the obtaining the device fingerprint information by using the UDP port-based probe protocol in S760 (for details, refer to Embodiment 2) is performed after the identification of the MAC address information in S720 is completed. In addition, there is no sequence for performing step S750 and step S760 either. In some embodiments, step S730 may be first performed to obtain the port information of the target device and complete the identification, and then step S750 is performed to obtain the device fingerprint information by using the TCP port-based probe protocol, and then step S760 is performed to obtain the device fingerprint information by using the UDP port-based probe protocol. In some other embodiments, step S730 may be first performed to obtain the port information of the target device and complete the identification, and then step S760 is performed, and then step S750 is performed.

The UDP port-based probe protocol includes but is not limited to the ONVIF protocol, the multicast domain name system (MDNS) protocol (including the MDNS of the physical security interoperability alliance (PSIA) protocol), the session initiation protocol (SIP) (including the SIP of the GB/T 28181 protocol), the domain name system (DNS) protocol, and a proprietary protocol.

Specifically, the detection device sends, based on a preset multicast probe protocol list (for example, the ONVIF probe protocol, the MDNS probe protocol, the SIP probe protocol, the COAP probe protocol, and a proprietary SDK probe protocol), a corresponding UDP probe message to a multicast address and a port that correspond to each multicast probe protocol (for example, the ONVIF corresponds a multicast address 239:255:255:250 and a port 3702, and the MDNS corresponds to a multicast address 224.0.0.251 and a port 5353), and waits, on a corresponding listening port, for receiving a response message returned by the target device, to extract the device fingerprint information of the target device; and/or sends, based on a preset broadcast probe protocol list (for example, a proprietary SDK probe protocol), a corresponding UDP probe message to a broadcast address and a port that correspond to each broadcast probe protocol (for example, a proprietary SDK protocol 1 corresponds to a broadcast address IP1 and a port P1, and a proprietary SDK protocol 2 corresponds to a broadcast address IP2 and a port P2), and waits, on a corresponding listening port, for receiving a response message returned by the target device, to extract the device fingerprint information of the target device.

If the detection device receives, on a listening port corresponding to each multicast or broadcast probe protocol, a response message returned by the target device, the detection device processes the corresponding response message (extracts the device fingerprint information) in a device fingerprint extraction manner corresponding to the multicast or broadcast probe protocol, and performs matching according to a corresponding matching method, for example, performs matching based on a preset fingerprint database (one fingerprint database may be set for each probe mode, or one fingerprint database may be set for a plurality of probe modes, or one fingerprint database may be set for all probe modes) and according to a corresponding matching rule (for example, matching based on information such as a specific keyword, specific MAC information, or specific port information). If matching valid fingerprint information exists, it is determined that the target device that sends the response message is an IPC device; otherwise, the target device is not an IPC device.

It should be noted that, in this step, if the detection device receives a response message sent by a target device other than the target device discovered in step S710, extracts device fingerprint information based on the response message, and successfully determines, through matching, that the target device is an IPC device, the detection device may further perform step S710 again. In other words, the detection device further performs step S710 for the another newly discovered target device to obtain MAC address information of the another target device, so as to help further locate the another target device subsequently. Certainly, the identification operation in step S720 may alternatively be performed on the MAC address information. This is not limited herein.

S770: Combine detection results.

In this step, identification and detection results in steps S710 to S760 may be combined. For example, it is identified, in step S720 based on the MAC address information, that the target device 1 is an IPC device; it is identified, in step S730 based on the port information, that the target device 2 is an IPC device; it is identified, in step S740 with reference to the MAC information and the port information, that the target device 3 is an IPC device; and whether the target device 4 is an IPC device is determined in step S750 based on the device fingerprint information obtained by using the TCP port-based probe protocol or in step S760 based on the device fingerprint information obtained by using the UDP port-based probe protocol. Therefore, the identified IPC devices are combined into one category based on the foregoing determining results.

In some embodiments, after it is identified, based on steps S710 to S740, that the target device 1, the target device 2, and the target device 3 are IPC devices, to ensure identification accuracy, whether the target device 1, the target device 2, the target device 3, and the target device 4 are IPC devices may be further determined based on step S750 or step S760, and identification results are combined.

It should be noted that, in this embodiment of this application, in step S730, S750, or S760, after an identified IPC device is excluded, corresponding detection and determining may be performed on a remaining target device that is not identified as an IPC device. Certainly, the identified IPC device may alternatively not be excluded, but corresponding detection and determining are performed on all target devices discovered in step S710.

The detection device may separately obtain device fingerprint information in at least two manners specified in the plurality of probe protocols described in S750 and S760.

Example 1

Device fingerprint information 1 may be obtained based on the RTSP protocol, and device fingerprint information 2 may be obtained based on the ONVIF protocol or the SIP protocol. Then the device fingerprint information 1 and the device fingerprint information 2 are combined and deduplicated to generate new device fingerprint information. Then matching is performed on the new device fingerprint information to determine whether an IPC device exists.

Figure 8:
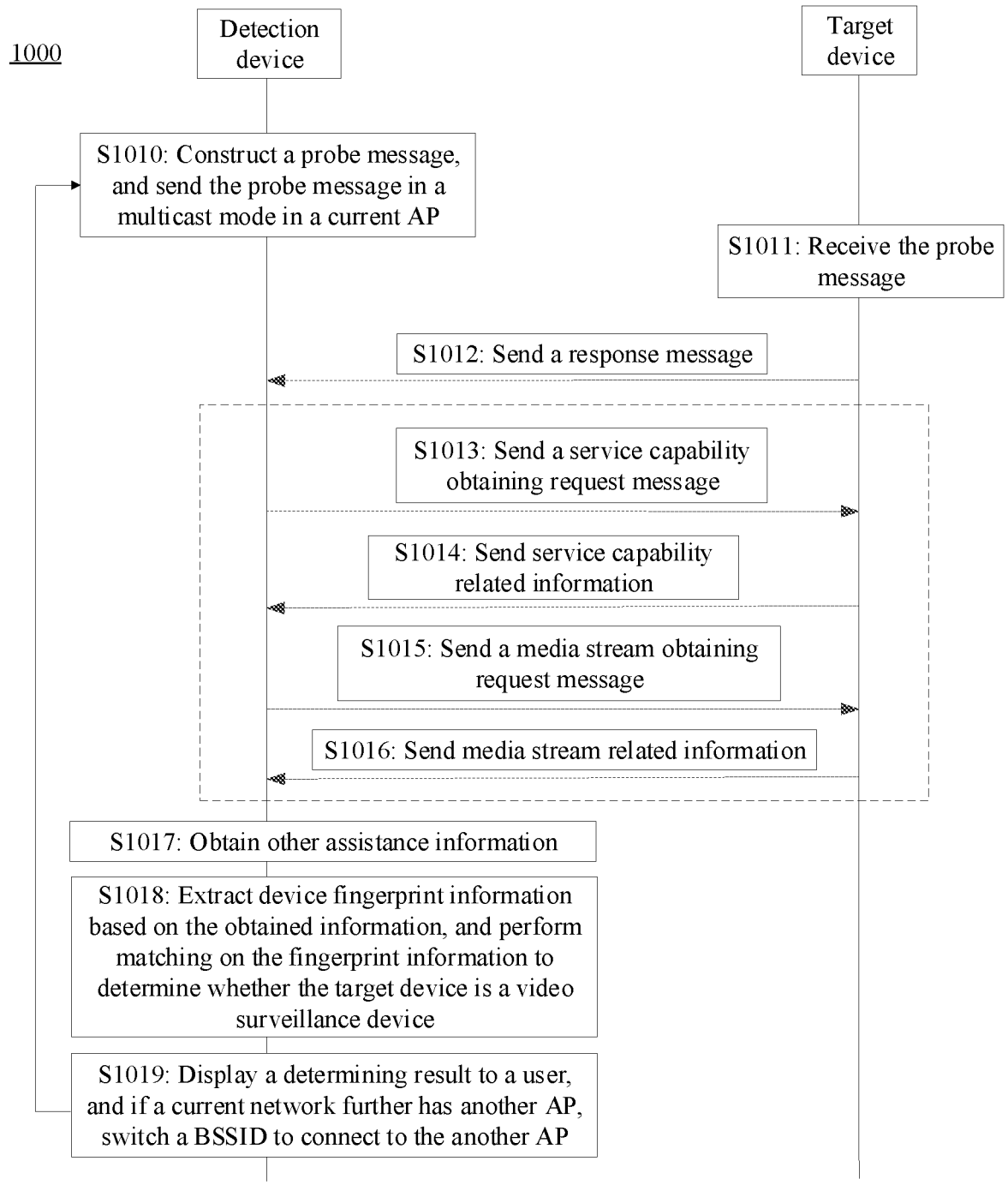
FIG. 8 is a schematic diagram of interaction between a detection device and a target device in an ONVIF protocol-based probe mode according to an embodiment of this application.
Figure 9:
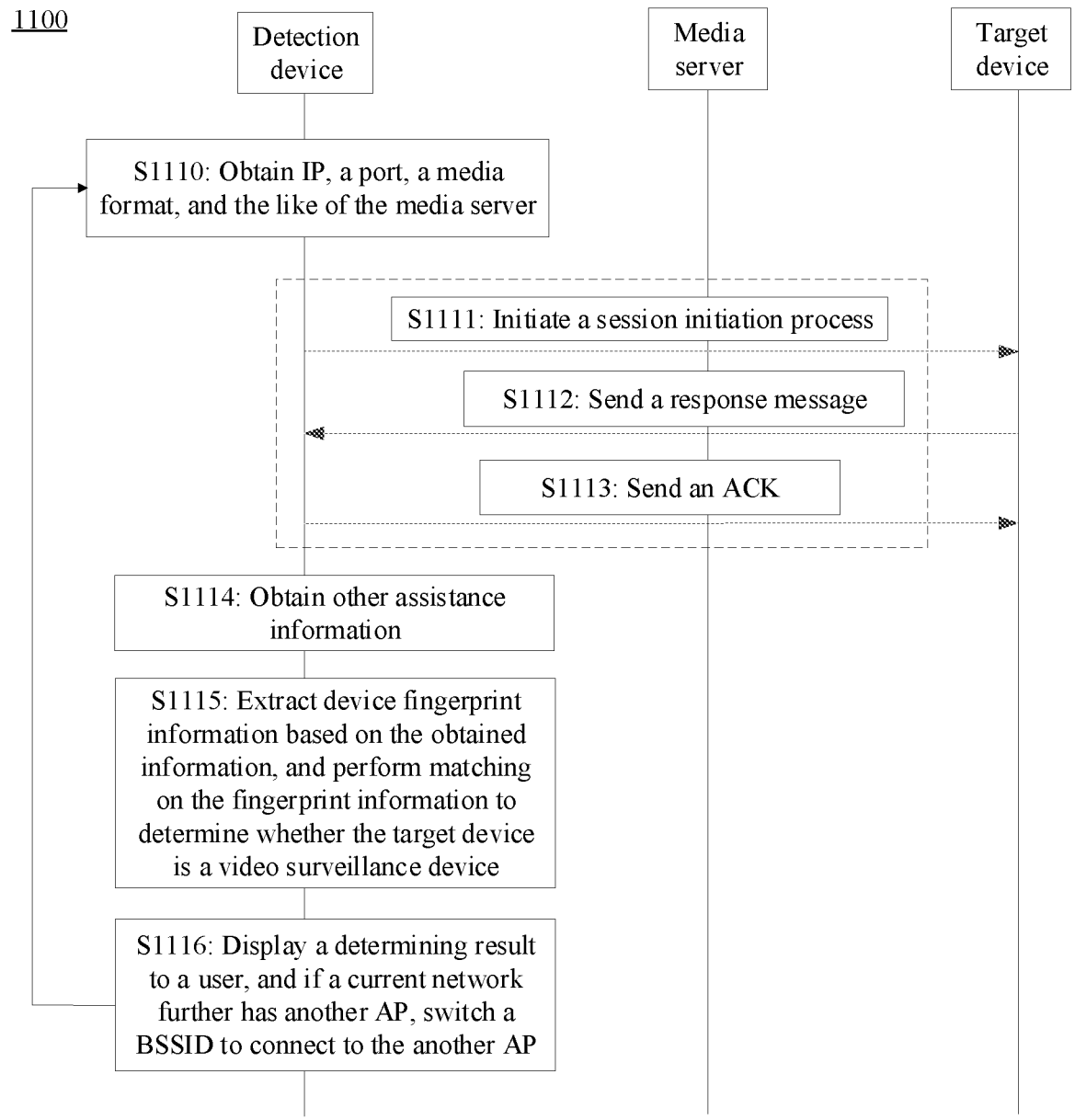
FIG. 9 is a schematic diagram of interaction between a detection device and a target device and a media server in a SIP protocol-based probe mode according to an embodiment of this application.

Specifically, the detection device may first perform steps S910 to S919 in FIG. 7 to obtain device fingerprint information 1 of the target device, and then obtain device fingerprint information 2 of the target device based on steps S1010 to S1016 in FIG. 8, or may perform steps S1110 to S1113 in FIG. 9 to obtain device fingerprint information 2 of the target device. The device fingerprint information 1 or 2 may include a plurality of pieces or types of fingerprint information.

After the device fingerprint information 1 and the device fingerprint information 2 are obtained in different manners, the information may be combined and deduplicated to generate new device fingerprint information, and then matching is performed on the new device fingerprint information to determine whether the target device is an IPC device.

It is assumed that the device fingerprint information 1 includes information such as IP and MAC address information of the target device and a corresponding manufacturer, corresponding port information and a status thereof (enabled, disabled, filtered, or the like), a corresponding service type, an application running on a port and a version of the application, an operating system running on the target device, and a type of the target device; and the device fingerprint information 2 includes an IP address, a device type, a device service scope, MAC address information, and the like of the target device, and a profile capability and a streaming capability of the target device. The detection device may remove the IP address, the device type, and the MAC address from the device fingerprint information 2 and combine remaining information, and then perform matching on new device fingerprint information to determine whether the target device is an IPC device.

Device fingerprint information of the target device is separately obtained by using different probe protocols, and the obtained device fingerprint information of the target device is combined and deduplicated to obtain new device fingerprint information, thereby further ensuring correctness of information and improving accuracy for detecting an IPC device.

Example 2

The detection device may obtain device fingerprint information based on a combination of a session initialization process of the GB/T 28181 protocol and a redirection server process of the RTSP protocol, and then perform matching on the device fingerprint information to determine whether an IPC device exists.

For example, the detection device may obtain device fingerprint information of the target device based on the combination of the session initialization process of the GB/T 28181 protocol and the redirection server process of the RTSP protocol. Specifically, the detection device may first perform steps S1110 to S1115 in FIG. 9 to obtain device fingerprint information 1 of the target device; then perform steps S910 to S919 in FIG. 7 to make the target device be disconnected from the original server and reconnected to the new server, and then obtain device fingerprint information 2 of the target device; and then combine and perform matching on the obtained device fingerprint information to determine whether the target device is an IPC device.

The device fingerprint information of the target device is obtained based on the combination of the session initialization process of the GB/T 28181 protocol and the redirection server process of the RTSP protocol, thereby further ensuring correctness of the obtained fingerprint information and improving accuracy for detecting an IPC device.

In addition, an execution sequence of steps S710 to S740 is not limited in this embodiment of this application. For example, step S710 may be first performed to complete host discovery to obtain another online/active target device in the current network, then port scanning is performed to obtain an open port list of each target device, and then steps S720 and S740 may be sequentially performed, or steps S740 and S720 may be sequentially performed, or step S720 or S740 may be directly skipped and then a subsequent step S750 or S760 is performed.

In this embodiment of this application, in some scenarios, an IPC device may not be disposed in a room in which a user of the detection device is located, for example, the IPC is disposed in a next room or a corridor. In such scenarios, the IPC may not cause a trouble or risk to user privacy. Therefore, a risk of a detected IPC device may be further filtered, to implement finer assessment. For example, channel state (channel state information, CSI) data and received signal strength indicator (RSSI) data may be obtained for each detected IPC device, and then whether the IPC device is to be filtered out is determined based on the obtained CSI and RSSI data (for example, if a CSI data volume is less than a specific threshold or an RSSI strength value is less than a specific threshold, the IPC device is discarded). To some extent, the CSI and RSSI data may be used to represent a distance between a detection mobile phone and the IPC device, whether an obstacle such as a wall exists between the mobile phone and the IPC device, whether APs accessed by the mobile phone and the IPC device belong to different channels, or the like.

In an embodiment provided in this application, an IPC device is identified through combination and cooperation of host discovery, port scanning, a TCP port-based probe protocol, a UDP port-based probe protocol, and a corresponding device fingerprint extraction and matching method. Compared with a solution in the conventional technology in which an IPC device is detected by a detection device by using an optical, thermal, or electromagnetic wave principle or the like, this embodiment can effectively help a user detect a secret photography IPC maliciously mounted in a place such as a hotel while reducing costs, thereby improving accuracy for detecting an IPC device and reducing user privacy invasion incidents.

Embodiment 2

In Embodiment 2 of this application, by using a UDP port-based probe protocol, a detection device can serve as a client or a server defined in the protocol, and publish a message to a target device in a same wireless network in a multicast or broadcast mode by using a fixed multicast or broadcast address and port. Therefore, the detection device can directly obtain device fingerprint information of the target device by using the UDP port-based probe protocol without using a detection technique such as host discovery, port scanning, or a TCP port-based probe protocol, and determine whether the target device is a video surveillance device.

It may be understood that the detection device may alternatively first obtain MAC address information of the target device before obtaining the fingerprint information of the target device by using the UDP port-based probe protocol. For details, refer to the descriptions of S710 and S720. If the detection device cannot determine, by using the MAC address information, whether the target device is a video surveillance device, the detection device may further perform determining on the target device by using the fingerprint information obtained by using the UDP port-based probe protocol. In this solution, detection accuracy can be further improved.

The UDP port-based probe protocol includes but is not limited to one or more of the ONVIF probe protocol, the PSIA/MDNS protocol, the GB/T 28181 protocol, the DNS protocol, and a proprietary protocol.

By using the ONVIF protocol as an example, obtaining device fingerprint information based on the ONVIF protocol is described in detail below with reference to a process of interaction between a detection device and a target device shown in FIG. 8.

The ONVIF is an international open standard network interface development forum for network video products. The forum has formulated an industry-specific ONVIF standard based on a principle of openness and defined general-purpose protocols, including apparatus searching, real-time videos, audio, metadata, control information, and the like, for information exchange between network video devices.

In this embodiment of this application, a device discovery process (WS-Discovery), a service capability obtaining process (GetServiceCapabilities, which is an optional step), and a media stream URI obtaining process (GetStreamUri, which is an optional step) defined in the ONVIF protocol are mainly used. The detection device sends a corresponding probe message to another device (which may be the target device determined based on the foregoing steps) connected to the AP, extracts device fingerprint information after receiving a corresponding response message, and then determines, based on the constructed device fingerprint information, whether the target device includes an IPC device. In addition, the detection device may further determine whether there is another AP that is not probed in the network. If yes, the detection device switches from the current AP to a next AP to continue to perform the foregoing probing.

In the foregoing device discovery process (WS-discovery), a client publishes a probe message in a multicast mode, where the probe message includes Types, service Scopes, Xaddrs (a device management service address), and the like. After determining that matching succeeds, the target device (an IPC) returns a probe match message in a unicast mode, where the probe match message includes Types, Scopes, and Xaddrs. In the foregoing service capability obtaining (GetServiceCapabilities), functions and services supported by the target device are obtained, and may include: a profile capability, for example, a total quantity of supported static and dynamic media profiles, and whether screenshot, rotation, video source mode switching, OSD configuration, or mask configuration is supported; and a media streaming (Streaming) capability, for example, whether the RTSP media streaming protocol is supported, whether UDP multicast is supported, and whether RTP/RTSP/TCP transmission is supported. In the foregoing media stream URL obtaining process (GetStreamUri), a media stream URL of the target device is obtained by using an IP address of the target device (the URL may be used in the RTSP protocol-based probe mode shown in FIG. 7, or may be used as a device fingerprint, or the like).

FIG. 8 includes steps S1010 to S1060.

S1010: The detection device constructs a probe message, and sends the probe message in a multicast mode in a current AP.

The detection device may construct a probe message, where the probe message may include a type of a target device, a service scope, a management service address of the target device, and the like. The probe message may be a probe request message defined in the device discovery process of the ONVIF protocol.

The multicast may also be referred to as groupcast, and may be a "one-to-many" mode. To be specific, the detection device sends the probe message to a specific multicast address and port in a multicast mode, so that the probe message can be sent to all target devices in the network at a time. The multicast address and port may be 239.255.255.250:3702.

S1011: The target device receives the probe message.

In step S1010, the detection device sends the probe message in a multicast mode, and a plurality of devices may receive the probe message. If some of the devices support a device discovery mechanism of the ONVIF protocol (that is, can parse the probe message), the devices respond to the probe message, and these devices are the target device in this application.

S1012: The target device sends a response message to the detection device.

The response message may include an IP address, a device type, a device service scope, MAC address information, and the like of the target device. The response message may be a probe match message defined in the device discovery process of the ONVIF protocol.

It should be noted that, in this embodiment of this application, the target device may send the response message to the detection device in a unicast mode, or may send the response message to the detection device in a multicast mode. This is not limited.

The unicast mode may be a "one-to-one" mode. To be specific, one device may send a message to another target device each time.

Based on this, the detection device may obtain fingerprint device information of the target device, to perform matching against a fingerprint database based on the fingerprint device information, so as to determine whether the probed target device is an IPC device.

Optionally, to further improve accuracy of determining, the detection device may obtain service capability information and media streaming information of the target device by using the service capability obtaining process and the media stream URL obtaining process. This may be implemented by using steps S1013 to S1016.

S1013: The detection device sends a service capability obtaining request message to the target device.

The service capability obtaining request message may include information such as the IP address of the target device, and the request message may be a GetServiceCapability request defined in the service capability obtaining process of the ONVIF protocol.

S1014: The target device sends service capability related information to the detection device.

For example, the service capability related information may include a profile capability, that is, whether the target device supports screenshot, rotation, video mode switching, object sequence diagram (on-screen display, OSD) configuration, mask configuration, and the like. The information may be obtained by using a GetServiceCapability response defined in the service capability obtaining process of the ONVIF protocol.

S1015: The detection device sends a media stream URL obtaining request message to the target device.

The media stream URL obtaining request message may include information such as the IP address of the target device. The request message may be a GetStreamUri request defined in the media stream URL obtaining process of the ONVIF protocol.

S1016: The target device sends media stream related information to the detection device.

For example, the media stream related information may include a streaming capability, that is, whether the target device supports the RTSP media streaming protocol, whether the target device supports UDP multicast, and whether the target device supports RTP, RTSP, or TCP transmission. The information may be obtained by using a GetStreamUri response defined in the media stream URL obtaining process of the ONVIF protocol.

S1017: The detection device obtains other assistance information.

The assistance information may be GPS location information or a Wi-Fi SSID or name (for example, xxx hotel/hotel) of the probed target device.

S1018: The detection device extracts device fingerprint information based on the obtained information, and performs matching on the fingerprint information to determine whether the target device is a video surveillance device.

S1019: The detection device displays a determining result to a user, and if the current network further has another AP, switches a BSSID to connect to the another AP.

For descriptions of steps S1017 to S1019, refer to the descriptions of steps S920 to S922 in FIG. 7. For brevity, details are not described herein again.

By using the GB/T 28181 transmission channel negotiation protocol as an example, obtaining device fingerprint information based on the GB/T 28181 protocol is described in detail below with reference to a process of interaction between a detection device, a media server, and a target device shown in FIG. 9.

The GB/T 28181 protocol may include the SIP signaling control protocol and the RTP/RTCP protocol. The SIP protocol defines a plurality of types of SIP signaling, such as Invite, ACK, BAY, OPTIONS, and Message. SIP signaling format description protocols include the session description protocol (SDP), the monitoring and alarming network system control description protocol (MANSCDP), the monitoring and alarming network system real-time streaming protocol (MANSRTSP), and the like.

The SIP may be used to establish a session between devices and transmit a system control command. The SDP may be used as a SIP signaling format protocol for session negotiation and media negotiation during session establishment between devices. The MANSCDP may be used as a SIP signaling format protocol for IPC device control, device information querying, state information reporting, and the like. The MANSRTSP may be used as a SIP signaling format protocol for playing, pausing, disconnecting, or the like during replay.

A session initialization (Invite) process is a first step of a service process such as real-time on-demand, replay, or download, and is mainly as follows: A SIP server establishes a session and negotiates upon a media transmission mode between the media server and a media transmit end (an IPC), so that the IPC transmits media stream data to the media server; and then establishes a session and negotiates upon a media transmission mode between the media server and a media receive end (user equipment, for example, an electronic device such as a mobile phone), so that the media server transmits media stream data to the receive end.

In this embodiment of this application, the session initiation process defined in the SIP signaling protocol of the GB/T 28181 protocol is mainly used. The detection device sends a corresponding probe message to another device connected to the AP, extracts device fingerprint information after receiving a corresponding response message, and then determines, based on the constructed device fingerprint information, whether the target device includes an IPC device. In addition, the detection device may further determine whether there is another AP that is not probed in the network. If yes, the detection device switches from the current AP to a next AP to continue to perform the foregoing probing.

Specifically, detailed descriptions are provided below with reference to FIG. 9. FIG. 9 may include steps S1110 to S1116.

S1110: The detection device obtains IP, a port, a media format, and the like of the media server.

The detection device may initiate a session initiation request (for example, an invite request) to the media server, and after receiving the session initiation request, the media server may send a 200 success response message to the detection device, where the message may include an SDP message body of the media server, such as the IP, the port, and the media format of the media server. Alternatively, the detection device may construct, based on a maintained media server list, an invite message to be sent to the target device, where the invite message may include the IP, the port, and the media format of the media server.

S1111: The detection device initiates a session initiation process to the target device.

The detection device may initiate a session initiation request to the target device to obtain an SDP message body of the target device, where the message body may include IP, a port, a media format, a synchronization source (SSRC), a media parameter, and the like of the target device.

S1112: The target device sends a response message to the detection device.

After the detection device initiates the session initialization process, the target device may respond to the session initialization process, and the target device may send a response message to the detection device, where the message may include information such as the IP, the port, the media format, the SSRC, and the media parameter of the target device.

S1113: The detection device sends an ACK to the target device.

The ACK may indicate that the detection device has received a final response to the session initiation request from the target device.

S1114: The detection device obtains other assistance information.

S1115: The detection device extracts device fingerprint information based on the obtained information, and performs matching on the fingerprint information to determine whether the target device is a video surveillance device.

S1116: The detection device displays a determining result to a user, and if the current network further has another AP, switches a BSSID to connect to the another AP.

For descriptions of steps S1114 to S1116, refer to the descriptions of steps S920 to S922 in FIG. 7. For brevity, details are not described herein again.

In the technical solution provided in Embodiment 2 of this application, the device fingerprint information of the target device is obtained by using the UDP port-based probe protocol, and matching is performed between the obtained device fingerprint information and a preset fingerprint information base, to determine whether the probed target device is an IPC device. In the technical solution, IPC device detection efficiency can be effectively improved while costs are reduced.

The following describes a process of a method for detecting a video surveillance device in this application.

Figure 10:
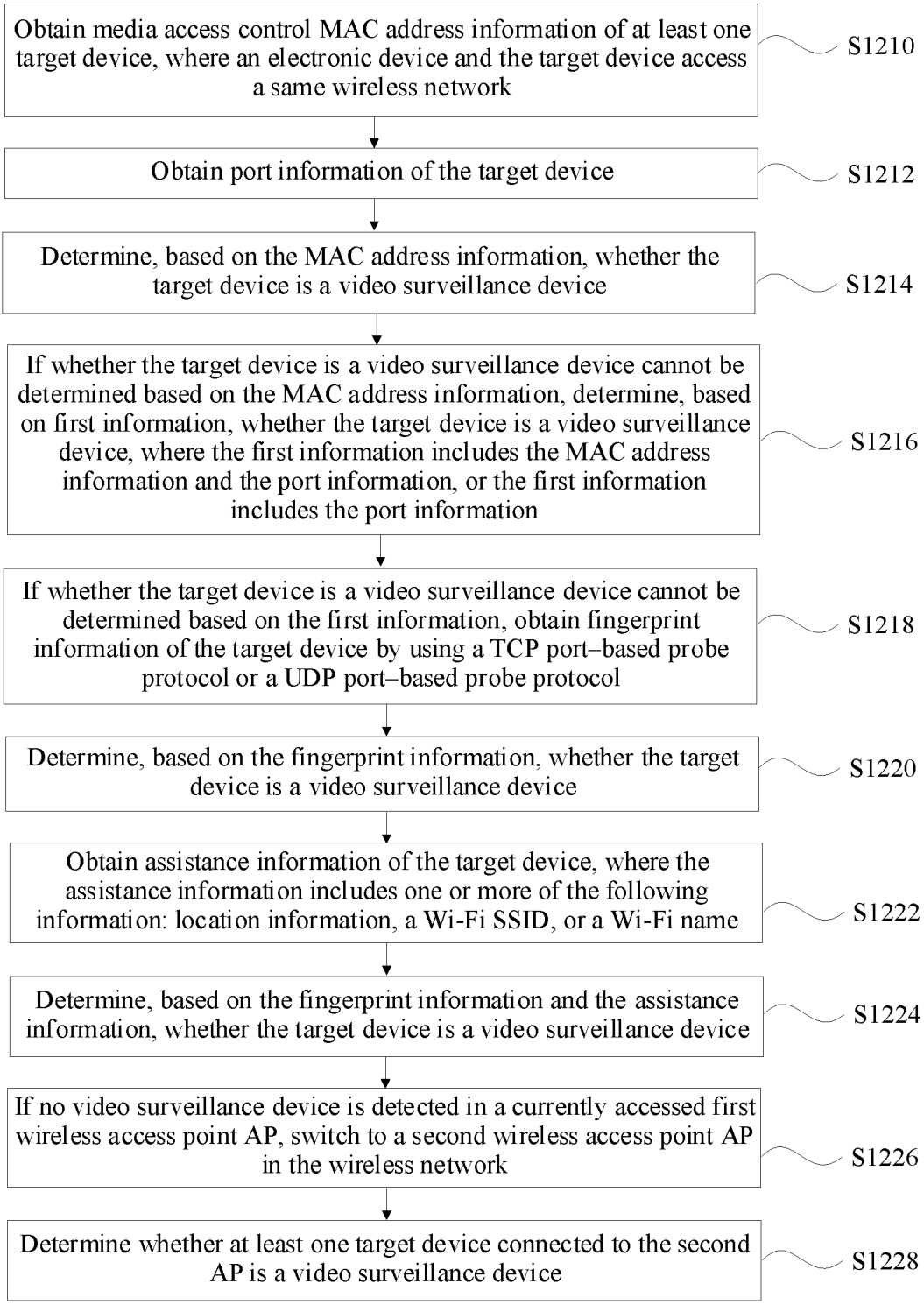
FIG. 10 is a schematic flowchart of another method for detecting a video surveillance device according to an embodiment of this application.

FIG. 10 is a schematic flowchart of a method 1200 for detecting a video surveillance device. Devices in the method flowchart include an electronic device 100 and a video surveillance device. The video surveillance device may be the camera shown in FIG. 5(a) to FIG. 5(e).

As shown in FIG. 10, the method 1200 may include the following steps.

S1210: Obtain media access control (MAC) address information of at least one target device, where the electronic device and the target device access a same wireless network.

In this embodiment of this application, the MAC address information of the at least one target device may be obtained by using a host discovery process. For details, refer to the content of step S710.

S1212: Obtain port information of the target device.

In this embodiment of this application, the port information of the target device may be obtained through port scanning. For detailed content, refer to the content of step S730.

S1214: Determine, based on the MAC address information, whether the target device is a video surveillance device.

In this step, whether the target device is a video surveillance device is determined based on the MAC address information. Matching may be performed between the obtained MAC address information of the target device and information in a MAC information base to identify a video surveillance device. For specific content, refer to the descriptions of step S720. Details are not described again.

S1216: If whether the target device is a video surveillance device cannot be determined based on the MAC address information, determine, based on first information, whether the target device is a video surveillance device, where the first information includes the MAC address information and the port information, or the first information includes the port information.

In this embodiment of this application, if whether the target device is a video surveillance device cannot be determined based on the MAC address information, determining may be further performed based on the first information (the MAC address information and the port information, or the port information). For details, refer to the content of step S740. Details are not described again.

It should be noted that, in this embodiment of this application, sequence numbers of the foregoing steps do not indicate an execution sequence. In some embodiments, the steps may be performed in a sequence of S1210, S1214, S1212, and S1216. This is not limited.

S1218: If whether the target device is a video surveillance device cannot be determined based on the first information, obtain fingerprint information of the target device by using a TCP port-based probe protocol or a UDP port-based probe protocol.

The fingerprint information in this embodiment of this application may be the device fingerprint information in step S750 and/or step S760. The device fingerprint information may include one or more of the following information of the target device: a device type of the target device, device manufacturer information, a port status, a port number, an application running on a port, a port service type, a running operating system, whether video mode switching or OSD configuration is supported, a supported transmission protocol type, a media format, a transmission mode, a service scope, an IP address, and a MAC address.

The TCP port-based probe protocol may be one or more of the protocols included in step S750, for example, the web protocol/HTTP, the DNS protocol, the Telnet protocol, the FTP, and the RTSP.

The UDP port-based probe protocol may be one or more of the protocols included in step S760: the ONVIF probe protocol, the MDNS protocol, the SIP, the DNS protocol, and the proprietary protocol.

S1220: Determine, based on the device fingerprint information, whether the target device is a video surveillance device.

In this step, whether the target device is a video surveillance device is determined based on the fingerprint information, and whether the target device is a video surveillance device may be determined based on the fingerprint information and according to a matching rule.

The matching rule may include a keyword matching method, a similarity calculation method, a distance calculation method, a preset model, and a feature vector matching method. For a specific matching process, refer to the content of step S921. For brevity, details are not described herein again.

S1222: Obtain assistance information of the target device, where the assistance information includes one or more of the following information: location information, a Wi-Fi SSID, or a Wi-Fi name.

S1224: Determine, based on the fingerprint information and the assistance information, whether the target device is a video surveillance device.

In this embodiment of this application, for the determining, based on the fingerprint information and the assistance information, whether the target device is a video surveillance device, refer to steps S920 and S921 in FIG. 7, or refer to steps S1017 and S1018 in FIG. 8, or refer to the content of steps S1114 and S1115 in FIG. 9.

S1226: If no video surveillance device is detected in a currently accessed first wireless access point (AP), switch to a second wireless access point (AP) in the wireless network.

S1228: Determine whether at least one target device connected to the second AP is a video surveillance device.

In an embodiment provided in this application, the MAC address information or the port information of the target device that accesses the same wireless network is obtained, and the fingerprint information of the target device is obtained by using the TCP port-based or UDP port-based probe protocol in different cases, to determine whether the target device is a video surveillance device. In the technical solution of this application, for various video surveillance devices on the market, a plurality of detection techniques including the MAC address information, the port information, and the TCP port-based or UDP port-based probe protocol are used to provide a more comprehensive detection solution, thereby effectively improving detection accuracy and reducing a missing detection rate. Scenarios to which the technical solution of this application is applicable may be places such as a hotel lobby and a room. The electronic device in this application can effectively detect secret photography IPCs that are maliciously mounted in such places, thereby reducing user privacy invasion incidents.

In addition, in some embodiments, some of the foregoing steps may alternatively be performed. For example, step S1218 may be performed to obtain the fingerprint information of the at least one target device by using the UDP port-based probe protocol, and then step S1220 is performed to determine, based on the fingerprint information, whether the target device is a video surveillance device.

Alternatively, step S1210 may be first performed to obtain the media access control (MAC) address information of the at least one target device, and then step S1214 is performed to determine, based on the MAC address information, whether the target device is a video surveillance device. If whether the target device is a video surveillance device cannot be determined based on the MAC address information, step S1218 may be performed to obtain the fingerprint information of the at least one target device by using the UDP port-based probe protocol, and step S1220 is performed to determine, based on the fingerprint information, whether the target device is a video surveillance device.

Alternatively, S1218 may be directly performed after steps S1210, S1212, and S1214 to obtain the fingerprint information of the target device by using the TCP port-based probe protocol when whether the target device is a video surveillance device cannot be determined based on the MAC address information, that is, logic of performing determining based on the port information is omitted. S1218 may even be directly performed after step S1212 to obtain the fingerprint information of the target device by using the TCP port-based probe protocol.

Alternatively, steps S1222 to S1224 or steps S1226 to S1228 may be omitted.

In addition, in some embodiments, some of the foregoing steps may alternatively be exchanged. For example, step S1212 may be performed to obtain the port information of the at least one target device; then, similar to step S1214, whether the target device is a video surveillance device is determined based on the port information; then step S1210 is performed to obtain the MAC address information of the target device; similar to step S1216, when whether the target device is a video surveillance device cannot be determined based on the port information, whether the target device is a video surveillance device is determined with reference to the MAC information; and finally, step S1218 and subsequent steps are performed.

In an embodiment provided in this application, the device fingerprint information of the target device is obtained by using the UDP port-based probe protocol, and matching is performed between the obtained device fingerprint information and a preset fingerprint information base, to determine whether the probed target device is an IPC device. In the technical solution, IPC device detection efficiency can be effectively improved while costs are reduced.

It may be understood that, to implement the foregoing functions, the electronic device (for example, the foregoing first electronic device) includes corresponding hardware and/or software modules for performing the functions. With reference to algorithm steps of examples described in embodiments disclosed in this specification, this application can be implemented in a form of hardware or a combination of hardware and computer software. Whether a function is performed by hardware or hardware driven by computer software depends on particular applications and design constraints of technical solutions. A person skilled in the art may use different methods to implement the described functions for each particular application with reference to embodiments, but it should not be considered that the implementation goes beyond the scope of this application.

In embodiments, the electronic device may be divided into functional modules based on the foregoing method examples. For example, each functional module corresponding to each function may be obtained through division, or two or more functions may be integrated into one processing module. The integrated module may be implemented in a form of hardware. It should be noted that, in embodiments, division into the modules is an example, and is merely logical function division. In an actual implementation, another division manner may be used.

Figure 11:
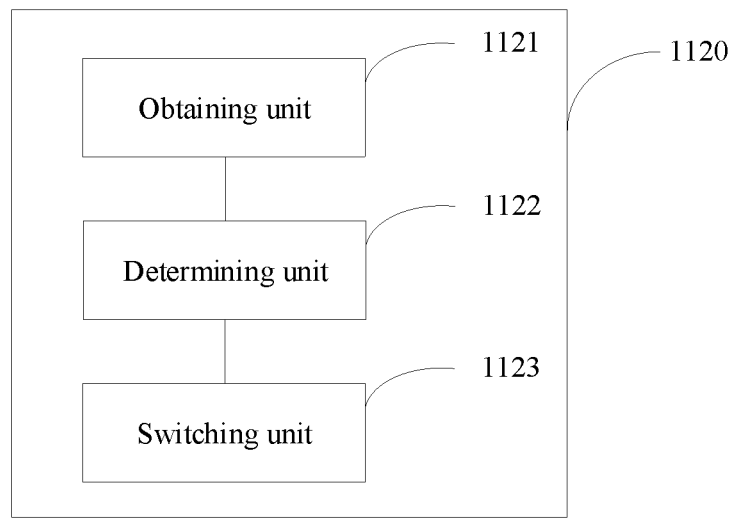
FIG. 11 is a schematic block diagram of another electronic device according to an embodiment of this application.

When the functional modules are obtained through division based on the corresponding functions, FIG. 11 is a schematic diagram of a possible composition of the electronic device 1120 in the foregoing embodiments. As shown in FIG. 11, the electronic device 1120 may include an obtaining unit 1121, a determining unit 1122, and a switching unit 1123.

The obtaining unit 1121 may be configured to support the electronic device 1120 in performing steps S1210, S1212, S1218, S1222, and the like, and/or used in another process of the technology described in this specification.

The determining unit 1122 may be configured to support the electronic device 1120 in performing steps S1214, S1216, S1220, S1224, S1228, and the like, and/or used in another process of the technology described in this specification.

The switching unit 1123 may be configured to support the electronic device 1120 in performing step S1226 and the like, and/or used in another process of the technology described in this specification.

It should be noted that all related content of the steps in the foregoing method embodiments may be cited in function descriptions of corresponding functional modules. Details are not described herein again.

The electronic device provided in this embodiment is configured to perform the foregoing positioning method, and therefore can achieve the same effects as the foregoing implementation methods.

When an integrated unit is used, the electronic device may include a processing module, a storage module, and a communication module. The processing module may be configured to control and manage actions of the electronic device, for example, may be configured to support the electronic device in performing the steps performed by the foregoing units. The storage module may be configured to support the electronic device in storing program code, data, and the like. The communication module may be configured to support communication between the electronic device and another device.

The processing module may be a processor or a controller. The processing module may implement or execute various example logical blocks, modules, and circuits described with reference to content disclosed in this application. The processor may alternatively be a combination for implementing a computing function, for example, a combination including one or more microprocessors or a combination of a digital signal processor (digital signal processing, DSP) and a microprocessor. The storage module may be a memory. The communication module may be specifically a device, for example, a radio frequency circuit, a Bluetooth chip, or a Wi-Fi chip, that interacts with another electronic device.

In an embodiment, when the processing module is a processor and the storage module is a memory, the electronic device in this embodiment may be a device with the structure shown in FIG. 1.

Figure 12:
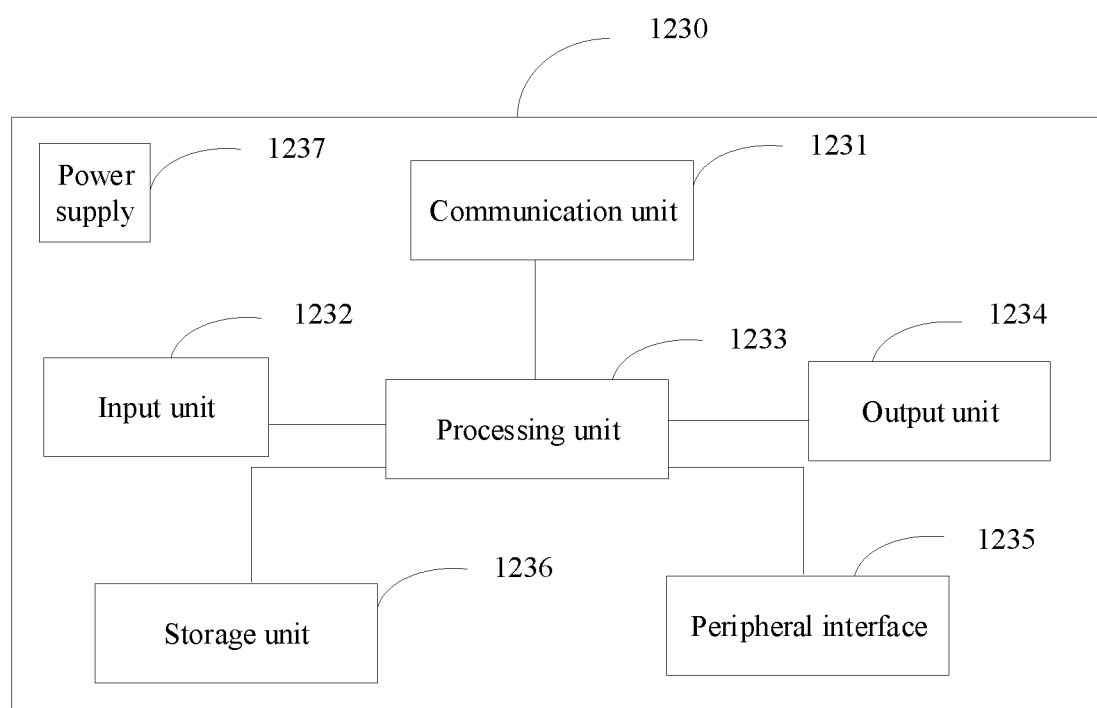
FIG. 12 is a schematic block diagram of still another electronic device according to an embodiment of this application.

FIG. 12 is a schematic diagram of another possible composition of the electronic device 1230 in the foregoing embodiments. As shown in FIG. 12, the electronic device 1230 may include a communication unit 1231, an input unit 1232, a processing unit 1233, an output unit 1234, a peripheral interface 1235, a storage unit 1236, and a power supply 1237.

The communication unit 1231 is configured to establish a communication channel, so that the electronic device 1230 is connected to a remote server through the communication channel and downloads media data from the remote server. The communication unit 1231 may include a communication module such as a WLAN module, a Bluetooth module, an NFC module, or a baseband module, and a radio frequency (RF) circuit corresponding to the communication module, and is configured to perform wireless local area network communication, Bluetooth communication, NFC communication, infrared communication, and/or cellular communication system communication, for example, wideband code division multiple access (W-CDMA) and/or high speed downlink packet access (HSDPA). The communication unit 1231 is configured to control communication of components in the electronic device, and can support direct memory access.

The input unit 1232 may be configured to implement interaction between a user and the electronic device and/or information input to the electronic device. In a specific implementation of the present application, the input unit may be a touch panel, or may be another human-computer interaction interface such as a physical input key or a microphone, or may be another external information capture apparatus such as a camera.

The processing unit 1233 is a control center of the electronic device, and may connect various parts of the entire electronic device by using various interfaces and lines, and perform various functions and/or data processing of the electronic device by running or executing a software program and/or a module stored in the storage unit and invoking data stored in the storage unit.

The output unit 1234 includes but is not limited to an image output unit and a voice output unit. The image output unit is configured to output a text, a picture, and/or a video. In a specific implementation of the present application, the touch panel used in the input unit 1232 may also be used as a display panel of the output unit 1234. For example, after detecting a gesture operation of touching or approaching the touch panel, the touch panel transmits the gesture operation to the processing unit to determine a type of a touch event, and then the processing unit provides a corresponding visual output on the display panel based on the type of the touch event. In FIG. 12, the input unit 1232 and the output unit 1234 serve as two separate components to implement input and output functions of the electronic device. However, in some embodiments, the touch panel and the display panel may be integrated to implement the input and output functions of the electronic device. For example, the image output unit may display various graphical user interfaces as virtual control components, including but not limited to a window, a scrollbar, an icon, and a clipboard, so that a user can perform an operation through touching.

In the foregoing embodiments, information indicating whether a video surveillance device exists in a current environment may be displayed by using the output unit 1234.

The storage unit 1236 may be configured to store a software program and a module. The processing unit runs the software program and the module that are stored in the storage unit to perform various function applications of the electronic device and implement data processing.

An embodiment further provides a computer storage medium. The computer storage medium stores computer instructions. When the computer instructions run on an electronic device, the electronic device is enabled to perform the foregoing related method steps to implement a method for detecting a video surveillance device in the foregoing embodiments.

An embodiment further provides a computer program product. When the computer program product runs on a computer, the computer is enabled to perform the foregoing related steps to implement a method for detecting a video surveillance device in the foregoing embodiments.

In addition, an embodiment of this application further provides an apparatus. The apparatus may be specifically a chip, a component, or a module, and the apparatus may include a processor and a memory that are connected to each other. The memory is configured to store computer-executable instructions. When the apparatus runs, the processor may execute the computer-executable instructions stored in the memory, so that the chip performs a method for detecting a video surveillance device in the foregoing method embodiments.

The electronic device, the computer storage medium, the computer program product, or the chip provided in embodiments is configured to perform the corresponding method provided above. Therefore, for beneficial effects that can be achieved, refer to the beneficial effects of the corresponding method provided above. Details are not described herein again.

Based on the descriptions of the foregoing implementations, a person skilled in the art may understand that, for a purpose of convenient and brief description, division into the foregoing functional modules is merely used as an example for illustration. In actual application, the foregoing functions may be allocated to different functional modules and implemented according to a requirement. In other words, an inner structure of the apparatus is divided into different functional modules to implement all or some of the functions described above.

In several embodiments provided in this application, it should be understood that the disclosed apparatuses and methods may be implemented in other manners. For example, the described apparatus embodiments are merely examples. For example, the division into the modules or units is merely logical function division and may be other division in an actual implementation. For example, a plurality of units or components may be combined or integrated into another apparatus, or some features may be ignored or not performed. In addition, the shown or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts shown as units may be one or more physical units, may be located in one place, or may be distributed in different places. Some or all of the units may be selected according to an actual requirement to achieve objectives of solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a readable storage medium. Based on such an understanding, technical solutions in embodiments of this application may be implemented in a form of a software product. The software product is stored in a storage medium and includes several instructions for instructing a device (which may be a single-chip microcomputer, a chip, or the like) or a processor to perform all or some of the steps of methods in embodiments of this application. The foregoing storage medium includes any medium that can store program code, such as a USB flash drive, a removable hard disk, a ROM, a RAM, a magnetic disk, or an optical disc.

The foregoing descriptions are merely example implementations of this application, but are not intended to limit the protection scope of this application. Any variation or replacement readily figured out by a person skilled in the art within the technical scope disclosed in this application may fall within the protection scope of this application.

What is claimed is:

1. A method for detecting a video surveillance device, comprising:
obtaining, by an electronic device, media access control (MAC) address information of a target device, wherein the electronic device and the target device access a same wireless network;

obtaining, by the electronic device, port information of the target device;

attempting, by the electronic device, to determine whether the target device is a video surveillance device based on the MAC address information;

based on the electronic device being unable to determine whether the target device is a video surveillance device based on the MAC address information, attempting, by the electronic device, to determine whether the target device is a video surveillance device based on first information, wherein the first information comprises the port information;

based on the electronic device being unable to determine whether the target device is a video surveillance device based on the first information, obtaining, by the electronic device, fingerprint information of the target device by sending a probe message according to a transmission control protocol (TCP) port-based probe protocol or a user datagram protocol (UDP) port-based probe protocol; and determining, by the electronic device, based on the fingerprint information, whether the target device is a video surveillance device.

2. The method according to claim 1, wherein attempting to determine whether the target device is a video surveillance device based on the MAC address information comprises determining whether the MAC address information is first-level MAC address information, wherein in case of the MAC address information not being first-level MAC address information, the electronic device is unable to determine whether the target device is a video surveillance device based on the MAC address information.

3. The method according to claim 2, wherein attempting to determine whether the target device is a video surveillance device based on the port information comprises determining whether the port information is first-level port information or determining whether the port information is second-level port information and whether the MAC address information is second-level MAC address information.

4. The method according to claim 1, wherein the fingerprint information of the target device is obtained by using the TCP port-based probe protocol, and wherein obtaining the fingerprint information of the target device by using the TCP port-based probe protocol comprises:

determining the TCP port-based probe protocol based on the port information;

sending the probe message to the target device based on the determined probe protocol;

receiving a response message from the target device; and extracting the fingerprint information of the target device based on the response message.

5. The method according to claim 4, wherein the TCP port-based probe protocol comprises one or more of:

a web protocol/hypertext transfer protocol (HTTP), a domain name system (DNS) protocol, a Telnet protocol, a file transfer protocol (FTP), or a real-time streaming protocol (RTSP).

6. The method according to claim 1, wherein the fingerprint information of the target device is obtained by using the UDP port-based probe protocol, and wherein obtaining the fingerprint information of the target device by using the UDP port-based probe protocol comprises:

sending, based on a preset probe protocol list, the probe message to an address and a port that correspond to each probe protocol;

receiving, on a corresponding listening port, a response message returned by the target device; and extracting the fingerprint information of the target device based on the response message.

7. The method according to claim 6, wherein the UDP port-based probe protocol comprises one or more of:

an open network video interface forum (ONVIF) protocol, a multicast domain name system (MDNS) protocol, a session initiation protocol (SIP), a domain name system (DNS) protocol, or a proprietary protocol.

8. The method according to claim 1, wherein the fingerprint information of the target device comprises one or more of the following information:

a device type, device manufacturer information, an IP address, a MAC address, a port status, a port number, a port service type, an application running on a port, a device operating system, or a device-supported service capability of the target device.

9. The method according to claim 1, wherein the method further comprises:

obtaining assistance information of the target device, wherein the assistance information comprises one or more of the following information: location information, a wireless fidelity service set identifier (Wi-Fi SSID), or a Wi-Fi name; and wherein determining whether the target device is a video surveillance device is based on the fingerprint information and the assistance information.

10. The method according to claim 1, wherein the electronic device switches from a first AP to the second wireless AP after no video surveillance device is detected in the first AP; and wherein the method further comprises: determining whether at least one target device connected to the second AP is a video surveillance device.

11. A method for detecting a video surveillance device, comprising:

obtaining, by an electronic device, media access control (MAC) address information of a target device, wherein the electronic device and the target device access a same wireless network;

attempting, by the electronic device, to determine whether the target device is a video surveillance device based on the MAC address information;

based on the electronic device being unable to determine whether the target device is a video surveillance device based on the MAC address information, obtaining, by the electronic device, fingerprint information of the target device by using a transmission control protocol (TCP) port-based probe protocol or a user datagram protocol (UDP) port-based probe protocol;

determining, by the electronic device. based on the fingerprint information, whether the target device is a video surveillance device; and after determining whether the target device is a video surveillance device, connecting, by the electronic device, to a second access point (AP) in the wireless network.

12. The method according to claim 11, wherein attempting to determine whether the target device is a video surveillance device based on the MAC address information comprises:
    determining whether the MAC address information is first-level MAC address information, wherein in case that the MAC address is first-level MAC address information, the target device is determined to be a video surveillance device.

13. The method according to claim 11, wherein the method further comprises:
    based on the electronic device being unable to determine whether the target device is a video surveillance device based on the MAC address information, attempting, by the electronic device, to determine whether the target device is a video surveillance device based on first information, wherein the first information comprises port information, and wherein the port information is obtained based on a status of a port.

14. The method according to claim 13, wherein attempting to determine whether the target device is a video surveillance device based on the port information comprises:
    in case that the port information is first-level port information, determining that the target device is a video surveillance device; or
    in case that the port information is second-level port information and the MAC address information is second-level MAC address information, determining that the target device is a video surveillance device.

15. The method according to claim 11, wherein the fingerprint information of the target device is obtained by using the TCP port-based probe protocol, and wherein obtaining the fingerprint information of the target device by using the TCP port-based probe protocol comprises:
    determining the TCP port-based probe protocol based on the port information;
    sending a probe message to the target device based on the determined probe protocol;
    receiving a response message from the target device; and
    extracting the fingerprint information of the target device based on the response message.

16. The method according to claim 11, wherein the fingerprint information of the target device is obtained by using the UDP port-based probe protocol, and wherein obtaining the fingerprint information of the target device by using the UDP port-based probe protocol comprises:
    sending, based on a preset probe protocol list, a corresponding UDP probe message to an address and a port that correspond to each probe protocol;
    receiving, on a corresponding listening port, a response message returned by the target device; and
    extracting the fingerprint information of the target device based on the response message.

17. The method according to claim 11, wherein the fingerprint information of the target device comprises one or more of the following information:
    a device type,
    device manufacturer information,
    an IP address,
    a MAC address,
    a port status,
    a port number,
    a port service type,
    an application running on a port,
    a device operating system, or
    a device-supported service capability of the target device.

18. The method according to claim 11, wherein the method further comprises:
    obtaining assistance information of the target device, wherein the assistance information comprises one or more of the following information: location information, a wireless fidelity service set identifier (Wi-Fi SSID), or a Wi-Fi name; and
    wherein determining whether the target device is a video surveillance device is based on the fingerprint information and the assistance information.

19. The method according to claim 11, wherein the electronic device switches from a first AP to the second wireless AP after no video surveillance device is detected in the first AP; and
    wherein the method further comprises: determining whether at least one target device connected to the second AP is a video surveillance device.

20. A non-transitory computer-readable medium having processor-executable instructions stored thereon for detecting a video surveillance device, wherein the processor-executable instructions, when executed, facilitate performance of the following:
    obtaining, by an electronic device, media access control (MAC) address information of a target device, wherein the electronic device and the target device access a same wireless network;
    attempting, by the electronic device, to determine whether the target device is a video surveillance device based on the MAC address information;
    based on the electronic device being unable to determine whether the target device is a video surveillance device based on the MAC address information, obtaining, by the electronic device, fingerprint information of the target device by sending a probe message according to a transmission control protocol (TCP) port-based probe protocol or a user datagram protocol (UDP) port-based probe protocol; and
    determining, by the electronic device, based on the fingerprint information, whether the target device is a video surveillance device.

* * * * *